US012423885B2

(12) United States Patent
Jin et al.

(10) Patent No.: US 12,423,885 B2
(45) Date of Patent: Sep. 23, 2025

(54) IMAGE PROCESSING METHOD AND ELECTRONIC DEVICE

(71) Applicant: HONOR DEVICE CO., LTD., Shenzhen (CN)

(72) Inventors: Meng Jin, Shenzhen (CN); Tao Shao, Shenzhen (CN); Dongmiao Xi, Shenzhen (CN); Junqin Su, Shenzhen (CN); Yanlin Qian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/924,305

(22) PCT Filed: May 7, 2022

(86) PCT No.: PCT/CN2022/091446
§ 371 (c)(1),
(2) Date: Nov. 9, 2022

(87) PCT Pub. No.: WO2023/015985
PCT Pub. Date: Feb. 16, 2023

(65) Prior Publication Data
US 2025/0086851 A1 Mar. 13, 2025

(30) Foreign Application Priority Data
Aug. 10, 2021 (CN) .......................... 202110915871.6

(51) Int. Cl.
*G06F 3/0481* (2022.01)
*G06T 11/00* (2006.01)

(52) U.S. Cl.
CPC .......... *G06T 11/001* (2013.01); *G06F 3/0481* (2013.01)

(58) Field of Classification Search
CPC ....... G06T 11/001; G06F 3/0481; G09G 5/02; G09G 5/06
See application file for complete search history.

(56) References Cited

U.S. PATENT DOCUMENTS 9,571,736 B2 * 2/2017 Lee .......................... G06T 11/40
10,445,866 B2 10/2019 Gao
(Continued)

FOREIGN PATENT DOCUMENTS

CN 106161990 A 11/2016
CN 109167930 A 1/2019
(Continued)

OTHER PUBLICATIONS

Fang-Ming et al., "Research on algorithms of color space conversion from YUV to RGB," Modern Electronics Technique, Nov. 2012, 35(22):4 pages (with English abstract).
(Continued)

*Primary Examiner* — Antonio A Caschera
(74) *Attorney, Agent, or Firm* — Fish & Richardson P.C.

(57) ABSTRACT

The image processing method includes: displaying a first screen, where the first screen includes a first control; detecting a first operation on the first control; determining a first mapping in a three-dimensional lookup table in response to the first operation, where the first mapping is corresponding to the first control; converting a to-be-processed image in a first color space into a first image in a second color space, where the to-be-processed image is an image obtained in the first color space; processing the first image according to the first mapping to obtain a second image; and converting the second image in the second color space into a third image in the first color space.

20 Claims, 22 Drawing Sheets

(56) References Cited

U.S. PATENT DOCUMENTS

| | | | | |
|---|---|---|---|---|
| 2010/0014131 A1* | 1/2010 | Cho | ................... | H04N 1/6077 |
| | | | | 358/504 |
| 2016/0247488 A1* | 8/2016 | McLin | ................... | G09G 5/06 |
| 2017/0358063 A1 | 12/2017 | Chen et al. | | |
| 2019/0052790 A1 | 2/2019 | Kang et al. | | |
| 2020/0027386 A1 | 1/2020 | Wang et al. | | |

FOREIGN PATENT DOCUMENTS

| | | | | |
|---|---|---|---|---|
| CN | 109361867 A | 2/2019 | | |
| CN | 111416950 A | 7/2020 | | |
| CN | 113126939 A | 7/2021 | | |
| CN | 108701351 B | 3/2022 | | |
| EP | 4024389 A1 * | 7/2022 | ........... | G06T 11/001 |
| JP | 2016149047 A | 8/2016 | | |
| JP | 2020065220 A | 4/2020 | | |
| WO | WO-2019061050 A1 * | 4/2019 | .............. | G03B 7/18 |
| WO | 2021052342 A1 | 3/2021 | | |

OTHER PUBLICATIONS

Qu et al., "A Color YUV Image Edge Detection Method Based on Histogram Equalization Transformation," Paper, Presented at Proceedings of the 2010 Sixth International Conference on Natural Computation (ICNC 2010), Yantai, China, Aug. 10-12, 2010, 4 pages.

* cited by examiner

IMAGE PROCESSING METHOD AND ELECTRONIC DEVICE

CROSS-REFERENCE TO RELATED APPLICATIONS

This application is a National Stage of International Application No. PCT/CN2022/091446, filed May 7, 2022, which claims priority to Chinese Patent Application No. 202110915871.6, filed on Aug. 10, 2021, both of which are incorporated herein by reference in their entireties.

TECHNICAL FIELD

This application relates to the image processing field, and specifically to an image processing method and an electronic device.

BACKGROUND

A lookup table (Lookup Table, LUT) is widely applied to image processing. For example, the lookup table may be applied to image color correction, image enhancement, image gamma correction, or the like. Specifically, the LUT may be loaded into an image signal processor (Image Signal Processor, ISP), and image processing may be performed on an original image frame based on the LUT table, to implement pixel value mapping of the original image frame to change a color style of an image, thereby achieving different image effects.

Currently, in a chip, a two-dimensional lookup table may be used to adjust hue and saturation of an image, but cannot be used to adjust, in different degrees, a color with same hue and different brightness based on brightness of the color. Consequently, a target image frame obtained after the image processing performed based on the two-dimensional lookup table is in poor quality.

Therefore, in a case that the chip is limited, how to improve quality of an image obtained after the image processing becomes an issue that needs to be resolved urgently.

SUMMARY

This application provides an image processing method and an electronic device, to implement image processing on an original image frame in aspects of hue, saturation, and brightness to improve image quality of a target image frame.

According to a first aspect, an image processing method is provided. The image processing method is applied to an electronic device and includes:

displaying a first screen, where the first screen includes a first control; detecting a first operation on the first control; determining, by the electronic device, a first mapping in a three-dimensional lookup table in response to the first operation, where the first mapping is corresponding to the first control; converting a to-be-processed image in a first color space into a first image in a second color space, where the to-be-processed image is an image obtained in the first color space; processing the first image according to the first mapping to obtain a second image; and converting the second image in the second color space into a third image in the first color space. In a possible implementation, the first color space may be a YUV color space, and the second color space may be an RGB color space.

It should be understood that, the first mapping in the three-dimensional lookup table may be a function relationship, and color information of each pixel may be re-determined by using the first mapping, to obtain new color information. An image pattern may be determined by using the first mapping in the three-dimensional lookup table, and the image pattern can achieve effects of different filters in a camera.

In this embodiment of this application, the electronic device may determine the first mapping in the three-dimensional lookup table based on the first operation, convert the obtained to-be-processed image in the first color space into the first image in the second color space, process the first image according to the first mapping to obtain the second image in the second color space, and convert the second image into the third image in the first color space to obtain a target image corresponding to the to-be-processed image. According to this embodiment of this application, the to-be-processed image can be processed in aspects of hue, saturation, and brightness according to the first mapping in the three-dimensional lookup table, to improve image quality of an output image.

With reference to the first aspect, in some implementations of the first aspect, the first control is a control that is used to indicate the first mapping in the three-dimensional lookup table.

In a possible implementation, the first screen may be a shooting preview screen, the shooting preview screen includes an image pattern preview box, the image pattern preview box may include a plurality of different image patterns, and the image patterns may refer to image filter effects. The detecting a first operation on the first control may be detecting an operation of selecting a target pattern in the image pattern preview box by a user. One image pattern may be corresponding to one mapping in the three-dimensional lookup table, in other words, one image pattern may be corresponding to one target three-dimensional lookup table.

With reference to the first aspect, in some implementations of the first aspect, the first control is a control that is used to indicate automatic identification of the first mapping in the three-dimensional lookup table.

In a possible implementation, the first screen may be a setting screen of a camera application, and the first operation may be an operation of enabling automatic image pattern recognition on the setting screen by the user. After automatic image pattern recognition is enabled, the camera application may determine a target pattern based on automatic recognition of a shooting scene.

With reference to the first aspect, in some implementations of the first aspect, the electronic device includes a first processor and a second processor.

The first processor is configured to obtain the to-be-processed image; and the second processor is configured to: convert the to-be-processed image in the first color space into the first image in the second color space, process the first image according to the first mapping to obtain the second image, and convert the second image in the second color space into the third image in the first color space.

In this embodiment of this application, the electronic device may include the first processor and the second processor. The first processor and the second processor may be different processors. Obtaining, by the electronic device, the to-be-processed image and the processing, by the electronic device, the to-be-processed image according to the first mapping in the three-dimensional lookup table may be performed by different processors in the electronic device.

Therefore, in this embodiment of this application, in a case of improving image quality of the processed image, operation efficiency of the image processing can also be improved.

In a possible implementation, the second processor supports parallel computing.

In this embodiment of this application, since the second processor can support the parallel computing, when the second processor processes the to-be-processed image according to the first mapping, a running time of the image processing can be shortened, improving efficiency of the image processing.

It should be understood that, the parallel computing may also be referred to as parallel computing, which means that a plurality of instructions may be executed at one time.

With reference to the first aspect, in some implementations of the first aspect, the first processor is an image signal processor, and the second processor is a digital signal processor or a graphics processing unit.

In a possible implementation, the second processor may be a digital signal processor or a graphics processing unit. The second processor may map four pixels, namely, 2×2 pixels, in the second image according to the first mapping in the three-dimensional lookup table at the same time.

With reference to the first aspect, in some implementations of the first aspect, the electronic device includes the pre-stored three-dimensional lookup table, and the determining, by the electronic device, a first mapping in a three-dimensional lookup table includes:

determining, according to an identifier of the first mapping, the first mapping from the pre-stored three-dimensional lookup table.

In this embodiment of this application, different mappings in the three-dimensional lookup table may be pre-stored in the electronic device. Based on the detected first operation, the first mapping in the three-dimensional lookup table may be determined, based on the identifier of the first mapping, from the different mappings that are pre-stored in the three-dimensional lookup table.

With reference to the first aspect, in some implementations of the first aspect, the converting a to-be-processed image in a first color space into a first image in a second color space includes:

performing first processing on the to-be-processed image to obtain a first-processed image, where the first processing is adjusting an image width of the to-be-processed image; and converting the first-processed image into the first image in the second color space.

In this embodiment of this application, the first processing may be first performed on the to-be-processed image, and then color space conversion is performed on the first-processed image. In this way, the to-be-processed image can meet a format of an image input by the second processor, thereby improving operation efficiency of the second processor.

With reference to the first aspect, in some implementations of the first aspect, the processing the first image according to the first mapping to obtain a second image includes:

processing the first image according to the first mapping and a tetrahedron interpolation algorithm to obtain the second image.

With reference to the first aspect, in some implementations of the first aspect, the processing the first image according to the first mapping and a tetrahedron interpolation algorithm to obtain the second image includes:

mapping each pixel in the first image according to the first mapping and the tetrahedron interpolation algorithm to obtain a target pixel; and obtaining the second image based on the target pixels.

With reference to the first aspect, in some implementations of the first aspect, the method further includes:

performing second processing on the third image, where the second processing is adjusting an image width of the third image to be the same as the image width of the to-be-processed image.

In this embodiment of this application, the second processing may be performed on the third image, so that an image obtained after the second processing can meet an image format of the electronic device.

According to a second aspect, an image processing apparatus is provided. The image processing apparatus includes a display unit and a processing unit. The display unit is configured to display a first screen, where the first screen includes a first control. The processing unit is configured to: detect a first operation on the first control; determine a first mapping in a three-dimensional lookup table in response to the first operation, where the first mapping is corresponding to the first control; convert a to-be-processed image in a first color space into a first image in a second color space, where the to-be-processed image is an image obtained in the first color space; process the first image according to the first mapping to obtain a second image; and convert the second image in the second color space into a third image in the first color space.

With reference to the second aspect, in some implementations of the second aspect, the image processing apparatus includes the pre-stored three-dimensional lookup table, and the processing unit is specifically configured to:

determine, according to an identifier of the first mapping, the first mapping from the pre-stored three-dimensional lookup table.

With reference to the second aspect, in some implementations of the second aspect, the processing unit is specifically configured to:

perform first processing on the to-be-processed image to obtain a first-processed image, where the first processing is adjusting an image width of the to-be-processed image; and convert the first-processed image into the first image in the second color space.

With reference to the second aspect, in some implementations of the second aspect, the processing unit is specifically configured to:

process the first image according to the first mapping and a tetrahedron interpolation algorithm to obtain the second image.

With reference to the second aspect, in some implementations of the second aspect, the processing unit is specifically configured to:

map each pixel in the first image according to the first mapping and the tetrahedron interpolation algorithm to obtain a target pixel; and obtain the second image based on the target pixels.

With reference to the second aspect, in some implementations of the second aspect, the processing unit is specifically configured to:

perform second processing on the third image, where the second processing is adjusting an image width of the third image to be the same as the image width of the to-be-processed image.

With reference to the second aspect, in some implementations of the second aspect, the first control is a control that is used to indicate the first mapping in the three-dimensional lookup table.

With reference to the second aspect, in some implementations of the second aspect, the first control is a control that is used to indicate automatic identification of the first mapping in the three-dimensional lookup table.

With reference to the second aspect, in some implementations of the second aspect, the image processing apparatus includes a first processor and a second processor.

The first processor is configured to obtain the to-be-processed image; and the second processor is configured to: convert the to-be-processed image in the first color space into the first image in the second color space, process the first image according to the first mapping to obtain the second image, and convert the second image in the second color space into the third image in the first color space.

With reference to the second aspect, in some implementations of the second aspect, the first processor is an image signal processor, and the second processor is a digital signal processor or a graphics processing unit.

When the image processing apparatus is a chip, the obtaining unit may be an output interface, a pin, a circuit, or the like, and the processing unit may be a processing unit inside the chip.

It should be understood that, extension, limitation, explanation, and description of the related content in the first aspect are also applicable to the same content in the second aspect.

According to a third aspect, an electronic device is provided. The electronic device includes one or more processors, a memory, and a display. The memory is coupled to the one or more processors, the memory is configured to store computer program code, the computer program code includes computer instructions, and the one or more processors invoke the computer instructions to enable the electronic device to perform the following steps: displaying a first screen, where the first screen includes a first control; detecting a first operation on the first control; determining a first mapping in a three-dimensional lookup table in response to the first operation, where the first mapping is corresponding to the first control; converting a to-be-processed image in a first color space into a first image in a second color space, where the to-be-processed image is an image obtained in the first color space; processing the first image according to the first mapping to obtain a second image; and converting the second image in the second color space into a third image in the first color space.

With reference to the third aspect, in some implementations of the third aspect, the electronic device includes the pre-stored three-dimensional lookup table, and the one or more processors invoke the computer instructions to enable the electronic device to perform the following step:
determining, according to an identifier of the first mapping, the first mapping from the pre-stored three-dimensional lookup table.

With reference to the third aspect, in some implementations of the third aspect, the one or more processors invoke the computer instructions to enable the electronic device to perform the following steps:
performing first processing on the to-be-processed image to obtain a first-processed image, where the first processing is adjusting an image width of the to-be-processed image; and
converting the first-processed image into the first image in the second color space.

With reference to the third aspect, in some implementations of the third aspect, the one or more processors invoke the computer instructions to enable the electronic device to perform the following step:
processing the first image according to the first mapping and a tetrahedron interpolation algorithm to obtain the second image.

With reference to the third aspect, in some implementations of the third aspect, the one or more processors invoke the computer instructions to enable the electronic device to perform the following steps:
mapping each pixel in the first image according to the first mapping and the tetrahedron interpolation algorithm to obtain a target pixel; and
obtaining the second image based on the target pixels.

With reference to the third aspect, in some implementations of the third aspect, the one or more processors invoke the computer instructions to enable the electronic device to perform the following step:
performing second processing on the third image, where the second processing is adjusting an image width of the third image to be the same as the image width of the to-be-processed image.

With reference to the third aspect, in some implementations of the third aspect, the first control is a control that is used to indicate the first mapping in the three-dimensional lookup table.

With reference to the third aspect, in some implementations of the third aspect, the first control is a control that is used to indicate automatic identification of the first mapping in the three-dimensional lookup table.

With reference to the third aspect, in some implementations of the third aspect, the one or more processors include a first processor and a second processor.

The first processor is configured to obtain the to-be-processed image; and the second processor is configured to: convert the to-be-processed image in the first color space into the first image in the second color space, process the first image according to the first mapping to obtain the second image, and convert the second image in the second color space into the third image in the first color space.

With reference to the third aspect, in some implementations of the third aspect, the first processor is an image signal processor, and the second processor is a digital signal processor or a graphics processing unit.

It should be understood that, extension, limitation, explanation, and description of the related content in the first aspect are also applicable to the same content in the third aspect.

According to a fourth aspect, an electronic device is provided. The electronic device includes one or more processors, a memory, and a display. The memory is coupled to the one or more processors, the memory is configured to store computer program code, the computer program code includes computer instructions, and the one or more processors invoke the computer instructions to enable the electronic device to perform any image processing method in the first aspect.

According to a fifth aspect, a chip system is provided. The chip system is applied to an electronic device. The chip system includes one or more processors, and the processor is configured to invoke computer instructions to enable the electronic device to perform any image processing method in the first aspect.

According to a sixth aspect, a computer-readable storage medium is provided. The computer-readable storage medium stores computer program code. When the computer program code is executed by an electronic device, the electronic device is enabled to perform any image processing method in the first aspect.

According to a seventh aspect, a computer program product is provided. The computer program product includes computer program code. When the computer program code is executed by an electronic device, the electronic device is enabled to perform any image processing method in the first aspect.

In the embodiments of this application, the electronic device may determine the first mapping in the three-dimensional lookup table based on the detected first operation on the first control, convert the obtained to-be-processed image in the first color space into the first image in the second color space, process the first image according to the first mapping to obtain the second image in the second color space, and convert the second image into the third image in the first color space to obtain an image after the image processing is performed on the to-be-processed image. According to the embodiments of this application, the to-be-processed image can be processed in aspects of hue, saturation, and brightness according to the first mapping in the three-dimensional lookup table, to improve image quality of an output image.

DETAILED DESCRIPTION OF EMBODIMENTS

The following describes technical solutions of the embodiments in this application with reference to accompanying drawings.

Figure 1:
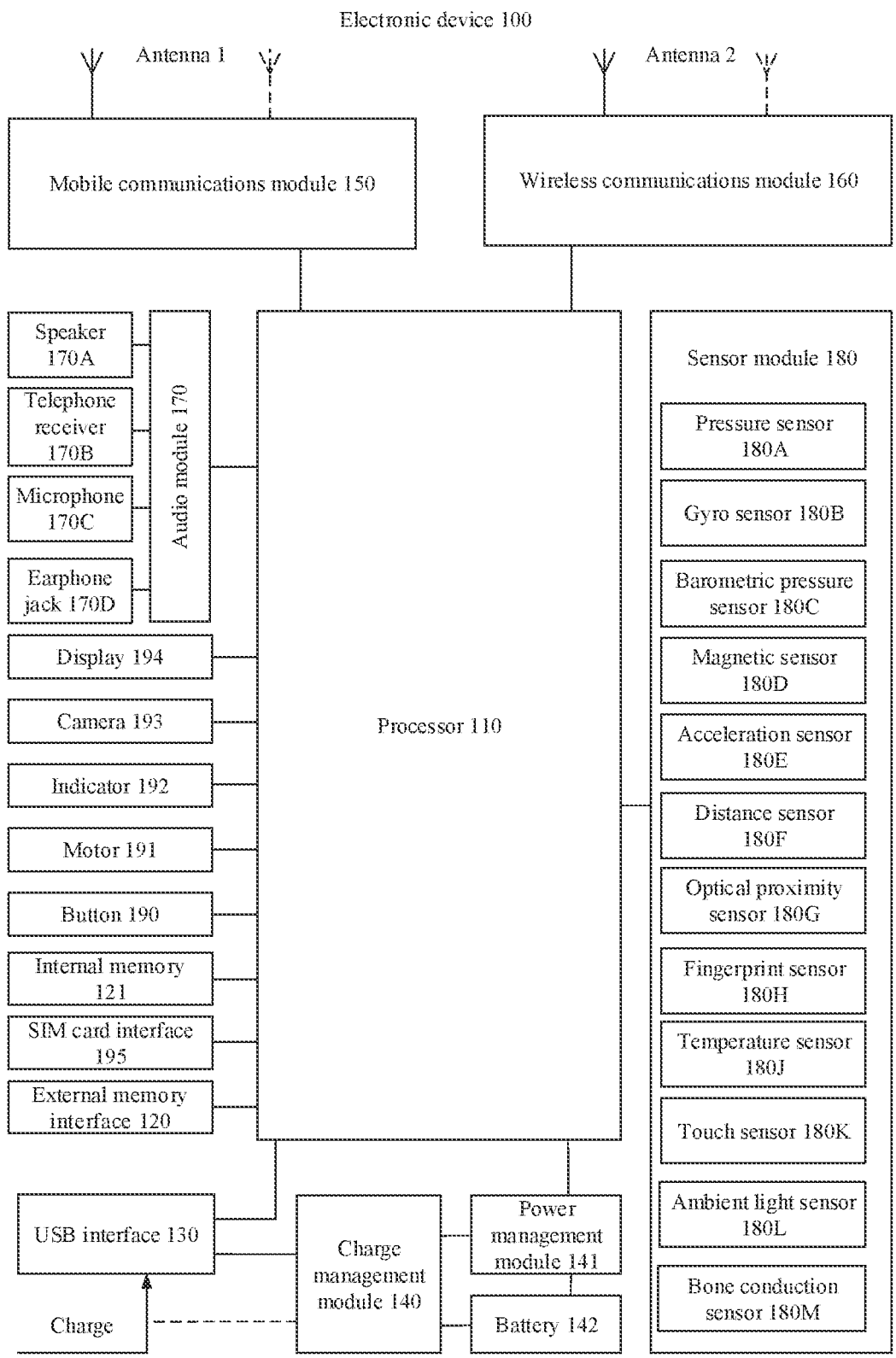
FIG. 1 is a schematic diagram of a hardware system of an apparatus applicable to this application.

FIG. 1 shows a hardware system of a terminal device applicable to this application.

The terminal device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. This embodiment of this application imposes no limitation on a specific type of the terminal device 100.

The terminal device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute a specific limitation on the terminal device 100. In some other embodiments of this application, the terminal device 100 may include more or fewer components than shown in FIG. 1; or the terminal device 100 may include a combination of some of the components shown in FIG. 1; or the terminal device 100 may include sub-components of some of the components shown in FIG. 1. The components shown in the FIG. 1 may be implemented by using hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components or may be an integrated device.

The controller may generate an operation control signal based on instruction operation code and a timing signal, to complete control of instruction fetching and execution.

A memory may be further provided in the processor 110 to store instructions and data. In some embodiments, the memory in the processor 110 is a cache. The memory may store instructions or data that the processor 110 has just used or used repeatedly. If the processor 110 needs to use the instructions or the data again, the processor 110 may directly invoke the instructions or the data from the memory, thereby avoiding repeated access, reducing a waiting time of the processor 110, and improving system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface. MIPI), a general-purpose input/output (general-purpose input/output, GPIO) interface, a SIM interface, and a USB interface.

The I2C interface is a bidirectional synchronous serial bus and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through an I2S bus to implement communication between the processor 110 and the audio module 170. In some embodiments, the audio module 170 may transfer an audio signal to the wireless communications module 160 through the I2S interface, to implement a function of answering calls through a Bluetooth earphone.

The PCM interface may also be configured to perform audio communication to sample, quantize, and encode an analog signal. In some embodiments, the audio module 170 may be coupled to the wireless communications module 160 through a PCM interface. In some embodiments, the audio module 170 may alternatively transfer an audio signal to the wireless communications module 160 through the PCM interface, to implement a function of answering calls through a Bluetooth earphone. Both the I2S interface and the PCM interface may be configured to perform audio communication.

The UART interface is a universal serial data bus and is configured to perform asynchronous communication. The bus may be a bidirectional communications bus that converts to-be-transmitted data between serial communication and parallel communication. In some embodiments, the UART interface is usually configured to connect the processor 110 to the wireless communications module 160. For example, the processor 110 communicates with a Bluetooth module of the wireless communications module 160 through the UART interface, to implement a Bluetooth function. In some embodiments, the audio module 170 may transmit an audio signal to the wireless communications module 160 through the UART interface, to implement a function of playing music by using a Bluetooth earphone.

The MIPI interface may be configured to connect the processor 110 to a peripheral device such as the display 194 and the camera 193. The MIPI interface includes a camera serial interface (camera serial interface, CSI), a display serial interface (display serial interface. DSI), and the like. In some embodiments, the processor 110 communicates with the camera 193 through the CSI interface to implement a shooting function of the terminal device 100. The processor 110 communicates with the display 194 through a DSI interface to implement a display function of the terminal device 100.

The GPIO interface may be configured by using software. The GPIO interface may be configured as a control signal interface or a data signal interface. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, or an MIPI interface.

The USB interface 130 is an interface that complies with the USB standard specification. For example, the USB interface 130 may be a mini (Mini) USB interface, a micro (Micro) USB interface, or a USB Type C (USB Type C) interface. The USB interface 130 may be configured to connect a charger to charge the terminal device 100, may also be configured to transmit data between the terminal device 100 and a peripheral device, and may also be configured to connect to an earphone to play audio by using the earphone. The USB interface 130 may be further configured to connect to another terminal device 100, for example, an AR device.

A connection relationship between the modules shown in FIG. 1 is merely used as an example for description, and does not constitute any limitation on the connection relationship between the modules of the terminal device 100. Optionally, the modules of the terminal device 100 may alternatively use a combination of a plurality of connection manners in the foregoing embodiments.

The charge management module 140 is configured to receive power from a charger. The charger may be a wireless charger or a wired charger. In some embodiments of wired charging, the charge management module 140 may receive a current from a wired charger through the USB interface 130. In some embodiments of wireless charging, the charge management module 140 may receive an electromagnetic wave (a current path is shown by a dashed line) by using a wireless charging coil of the terminal device 100. The charge management module 140 may also supply power to the terminal device 100 through the power management module 141 while charging the battery 142.

The power management module 141 is configured to connect to the battery 142, the charge management module 140, and the processor 110. The power management module 141 receives an input from the battery 142 and/or the charge management module 140 to supply power to the processor 110, the internal memory 121, the display 194, the camera 193, the wireless communications module 160, and the like. The power management module 141 may be further configured to monitor parameters such as battery capacity, battery cycle count, and battery state of health (electric leakage or impedance). Optionally, the power management module 141 may be provided in the processor 110; or the power management module 141 and the charge management module 140 may be provided in a same component.

A wireless communication function of the terminal device 100 may be implemented by using components such as the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device 100 may be configured to cover one or more communication bands. Different antennas may be reused to improve antenna utilization. For example, the antenna 1 may be reused as a diversity antenna of a wireless local area network. In some other embodiments, the antenna may be used in combination with a tuning switch.

The mobile communications module 150 may provide wireless communications solutions that are applied to the terminal device 100, for example, at least one of the following solutions: a $2^{nd}$ generation ($2^{nd}$ generation, 2G) mobile communications solution, a $3^{rd}$ generation ($3^{rd}$ generation, 3G) mobile communications solution, a $4^{th}$ generation ($4^{th}$ generation, 4G) mobile communications solution, and a $5^{th}$ generation ($5^{th}$ generation, 5G) mobile communications solution. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and then transmit a processed electromagnetic wave to the modem processor for demodulation. The mobile communications module 150 may further amplify a signal modulated by the modem processor, where the amplified signal is converted into an electromagnetic wave and radiated by using the antenna 1. In some embodiments, at least some function modules of the mobile communications module 150 may be provided in the processor 110. In some embodiments, at least some function modules of the mobile communications module 150 may be provided in a same component as at least some modules of the processor 110.

The modem processor may include a modulator and a demodulator. The modulator is configured to modulate a to-be-transmitted low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After the low-frequency baseband signal is processed by the baseband processor, a processed low-frequency baseband signal is transferred to the application processor. The application processor outputs a sound signal by using an audio device (for example, the speaker 170A and the telephone receiver 170B), or displays an image or a video by using the display 194. In some embodiments, the modem processor may be an independent component. In some other embodiments, the modem processor may be independent from the processor 110 and provided in a same component as the mobile communications module 150 or another function module.

Similar to the mobile communications module 150, the wireless communications module 160 may also provide wireless communications solutions that are applied to the terminal device 100, for example, at least one of the following solutions: a wireless local area network (wireless local area network, WLAN), Bluetooth (Bluetooth, BT). Bluetooth low energy (Bluetooth low energy, BLE), ultra wide band (ultra wide band, UWB), a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and transmits a processed signal to the processor 110. The wireless communications module 160 may further receive a to-be-transmitted signal from the processor 110, perform frequency modulation and amplification on the signal, convert a processed signal into an electromagnetic wave by using the antenna 2, and radiate the electromagnetic wave through the antenna 2.

In some embodiments, the antenna 1 and the mobile communications module 150 of the terminal device 100 are coupled, and the antenna 2 and the wireless communications module 160 of the terminal device 100 are coupled, so that the terminal device 100 can communicate with a network and another electronic device by using a wireless communications technology. The wireless communications technology may include at least one of the following communications technologies: global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and an IR technology. The GNSS may include at least one of the following positioning technologies: global positioning system (global positioning system, GPS), global navigation satellite system (global navigation satellite system, GLONASS), BeiDou navigation satellite system (BeiDou navigation satellite system, BDS), quasi-zenith satellite system (quasi-zenith satellite system, QZSS), and satellite based augmentation system (satellite based augmentation system, SBAS).

The terminal device 100 may implement a display function by using the GPU, the display 194, and the application processor. The GPU is a microprocessor for image processing, and is connected to the display 194 and the application processor. The GPU is configured to perform mathematical and geometric computing for graphics rendering. The processor 110 may include one or more GPUs that execute program instructions to generate or change display information.

The display 194 may be configured to display an image or a video. The display 194 includes a display panel. The display panel may use a liquid crystal display (liquid crystal display, LCD), organic light-emitting diodes (organic light-emitting diode, OLED), active-matrix organic light-emitting diodes (active-matrix organic light-emitting diode, AMOLED), flex light-emitting diodes (flex light-emitting diode, FLED), mini light-emitting diodes (mini light-emitting diode, Mini LED), micro light-emitting diodes (micro light-emitting diode, Micro LED), micro OLEDs (Micro OLED), or quantum dot light-emitting diodes (quantum dot light-emitting diode, QLED). In some embodiments, the terminal device 100 may include one or N displays 194, where N is a positive integer greater than 1.

The terminal device 100 may implement a shooting function by using the ISP, the camera 193, the video codec, the GPU, the display 194, the application processor, and the like.

The ISP is configured to process data fed back by the camera 193. For example, during shooting, a shutter is opened, allowing light to be transferred to a photosensitive element of the camera through a lens. An optical signal is converted into an electrical signal. The photosensitive element of the camera transfers the electrical signal to the ISP for processing, and the ISP converts the electrical signal into an image visible to naked eyes. The ISP may optimize noise, brightness, and a color of the image based on algorithms. The ISP may further optimize parameters such as exposure and color temperature of a shooting scene. In some embodiments, the ISP may be provided in the camera 193.

The camera 193 is configured to capture a static image or a video. An optical image is generated for an object by using the lens, and is projected onto the photosensitive element. The photosensitive element may be a charge coupled device (charge coupled device, CCD) or a complementary metal-oxide semiconductor (complementary metal-oxide semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format such as red green blue (red green blue, RGB) or YUV. In some embodiments, the terminal device 100 may include one or N cameras 193, where N is a positive integer greater than 1.

The digital signal processor is configured to process a digital signal. In addition to a digital image signal, the digital signal processor may process another digital signal. For example, when the terminal device 100 selects a frequency, the digital signal processor is configured to perform Fourier transform and the like on energy of the frequency.

The video codec is configured to compress or decompress a digital video. The terminal device 100 can support one or more types of video codecs, so that the terminal device 100 can play or record videos in a plurality of encoding formats, for example, moving picture experts group (moving picture experts group, MPEG)-1, MPEG-2, MPEG-3, and MPEG-4.

The NPU is a processor that emulates a biological neural network structure, may quickly process input information, for example, by emulating a mode of transfer between human-brain neurons, and may further perform self-learning constantly. With the NPU, the terminal device 100 can implement intelligent cognition and other functions such as image recognition, face recognition, voice recognition, and text understanding.

The external memory interface 120 may be configured to connect to an external storage card, for example, a secure digital (secure digital, SD) card, to expand a storage capacity of the terminal device 100. The external storage card communicates with the processor 110 through the external memory interface 120, to implement a data storage function, for example, storing a music file, a video file, or the like in the external storage card.

The internal memory 121 may be configured to store computer-executable program code, and the executable program code includes instructions. The internal memory 121 may include a program storage area and a data storage area. The program storage area may store an operating system, an application program required by at least one function (for example, a sound playing function and an image playing function). The data storage area may store data (for example, audio data and a phone book) created during use of the terminal device 100. In addition, the internal memory 121 may include a high-speed random access memory, and may further include a non-volatile memory, for example, at least one magnetic disk storage device, a flash memory device, and a universal flash storage (universal flash storage, UFS). By running the instructions stored in the internal memory 121 and/or instructions stored in a memory provided in the processor, the processor 110 implements various processing methods in the terminal device 100.

The terminal device 100 can implement an audio function such as music playing or sound recording by using the audio module 170, the speaker 170A, the telephone receiver 170B, the microphone 170C, the earphone jack 170D, the application processor, and the like.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 or some function modules of the audio module 170 may be provided in the processor 110.

The speaker 170A, also referred to as a loudspeaker, is configured to convert an audio electrical signal into a sound signal. The terminal device 100 may be used for listening to music or answering a hands-free call by using the speaker 170A.

The telephone receiver 170B, also referred to as an earpiece, is configured to convert an audio electrical signal into a sound signal. When using the terminal device 100 to answer a call or receive a voice message, a user can hear a voice by putting the telephone receiver 170B close to an ear.

The microphone 170C, also referred to as a mic or mike, is configured to convert a sound signal into an electrical signal. When making a call or sending a voice message, a user may input a sound signal into the microphone 170C by speaking close to the microphone 170C. The terminal device 100 may be provided with at least one microphone 170C. In some other embodiments, the terminal device 100 may be provided with two microphones 170C to implement a noise reduction function. In some other embodiments, the terminal device 100 may alternatively be provided with three, four, or more microphones 170C to implement functions of sound source identification, directional recording, and the like. The processor 110 may process the electrical signal output by the microphone 170C. For example, the audio module 170 and the wireless communications module 160 may be coupled through a PCM interface. After converting an ambient sound into an electrical signal (for example, a PCM signal), the microphone 170C transmits the electrical signal to the processor 110 through the PCM interface. The processor 110 performs volume analysis and frequency analysis on the electrical signal to determine a volume and a frequency of the ambient sound.

The earphone jack 170D is configured to connect to a wired earphone. The earphone jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be provided in the display 194. There are various types of pressure sensors 180A. For example, the pressure sensor 180A may be a resistive pressure sensor, an inductive pressure sensor, or a capacitive pressure sensor. The capacitive pressure sensor may include at least two parallel plates made of a conducting material. When force is applied to the pressure sensor 180A, a capacitance between electrodes changes. The terminal device 100 determines pressure intensity based on a change in the capacitance. When a touch operation is performed on the display 194, the terminal device 100 detects the touch operation by using the pressure sensor 180A. The terminal device 100 may also obtain a touch position through calculation based on a signal detected by the pressure sensor 180A. In some embodiments, touch operations that are performed in a same touch position but have different touch operation strength may be corresponding to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating a new SMS message is executed.

The gyro sensor 180B may be configured to determine a motion posture of the terminal device 100. In some embodiments, angular velocities of the terminal device 100 around three axes (that is, x, y, and z axes) may be determined by the gyro sensor 180B. The gyro sensor 180B may be configured to implement image stabilization during shooting. For example, when a shutter is pressed, the gyro sensor 180B detects a shaking angle of the terminal device 100, and calculates, based on the angle, a distance that a lens module needs to be compensated for, so that the lens can move reversely to counteract the shaking of the terminal device 100, to implement image stabilization. The gyro sensor 180B may also be used in a navigation scenario, a somatic game scenario, and the like.

The barometric pressure sensor 180C is configured to measure barometric pressure. In some embodiments, the terminal device 100 calculates an altitude based on a barometric pressure value measured by the barometric pressure sensor 180C, to assist in positioning and navigation.

The magnetic sensor 180D includes a Hall effect sensor. The terminal device 100 may detect opening/closing of a flip leather case by using the magnetic sensor 180D. In some embodiments, when the terminal device 100 is a clamshell phone, the terminal device 100 may detect opening/closing of a flip cover by using the magnetic sensor 180D. The terminal device 100 may set, based on a detected open/closed state of a leather case or a detected open/closed state of the flip cover, a feature that automatic unlocking is implemented when the clamshell phone is flipped open, or the like.

The acceleration sensor 180E may detect magnitudes of accelerations of the terminal device 100 in various directions (usually on x, y, and z axes), and may detect a magnitude and a direction of gravity when the terminal device 100 is still. The acceleration sensor 180E may be further configured to identify a posture of the terminal device 100 as an input parameter of an application such as landscape/portrait mode switching or a pedometer.

The distance sensor 180F is configured to measure a distance. The terminal device 100 may measure a distance in an infrared or a laser manner. In some embodiments, for example, in a shooting scene, the terminal device 100 may use the distance sensor 180F to measure a distance for rapid focusing.

The optical proximity sensor 180G may include, for example, a light-emitting diode (light-emitting diode, LED) and a light detector, for example, a photodiode. The LED may be an infrared LED, and the terminal device 100 emits infrared light to the outside by using the LED. The terminal device 100 uses a photodiode to detect infrared light reflected from a nearby object. When reflected light is detected, the terminal device 100 may determine that there is an object near the terminal device 100. When no reflected light is detected, the terminal device 100 may determine that there is no object near the terminal device 100. The terminal device 100 may detect, by using the optical proximity sensor 180G, whether a user is holding the terminal device 100 close to an ear for making a call, to automatically turn off the screen to save power. The optical proximity sensor 180G may also be used for automatic screen unlocking or locking in leather case mode or pocket mode.

The ambient light sensor 180L is configured to sense brightness of ambient light. The terminal device 100 may adaptively adjust brightness of the display 194 based on the sensed brightness of the ambient light. The ambient light sensor 180L may be further configured to automatically adjust white balance during shooting. The ambient light sensor 180L may also cooperate with the optical proximity sensor 180G to detect whether the terminal device 100 is in a pocket, to avoid an accidental touch.

The fingerprint sensor 180H is configured to collect fingerprints. The terminal device 100 can implement functions such as unlocking, application lock access, shooting, and call answering by using collected fingerprint characteristics.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor near the temperature sensor 180J, to reduce power consumption and implement thermal protection. In some other embodiments, when the temperature is lower than another threshold, the terminal device 100 heats the battery 142 to avoid abnormal shutdown of the terminal device 100 caused by low temperature. In some other embodiments, when the temperature is lower than still another threshold, the terminal device 100 boosts an output voltage of the battery 142 to avoid abnormal shutdown caused by low temperature.

The touch sensor 180K is also referred to as a touch device. The touch sensor 180K may be provided on the display 194, and the touch sensor 180K and the display 194 form a touchscreen. The touchscreen is also referred to as a touch panel. The touch sensor 180K is configured to detect a touch operation performed on or near the touch sensor 180K. The touch sensor 180K may transfer the detected touch operation to the application processor for determining a touch event type, and may provide a visual output related to the touch operation by using the display 194. In some other embodiments, the touch sensor 180K may alternatively be provided on a surface of the terminal device 100 at a different location than the display 194.

The bone conduction sensor 180M may obtain a vibration signal. In some embodiments, the bone conduction sensor 180M may obtain a vibration signal generated when a human voice vibrates a bone. The bone conduction sensor 180M may also sense human pulses to receive a blood pressure pulse signal. In some embodiments, the bone conduction sensor 180M may alternatively be provided in an earphone to form a bone conduction earphone. The audio module 170 may parse out a voice signal from the vibration signal obtained by the bone conduction sensor 180M when the human voice vibrates the bone, to implement a voice function. The application processor may parse out heart rate information from the blood pressure pulse signal obtained by the bone conduction sensor 180M, to implement a heart rate detection function.

The button 190 includes a power on/off button, a volume button, and the like. The button 190 may be a mechanical button or a touch button. The terminal device 100 may receive a button-based input signal to implement a function related to the button-based input signal.

The motor 191 may generate vibration. The motor 191 may be configured to provide an incoming call alert and a touch feedback. The motor 191 may generate different vibration feedback effects for touch operations performed on different applications. The motor 191 may also generate different vibration feedback effects for touch operations performed in different areas of the display 194. Different application scenarios (for example, time reminder, information receiving, alarm clock, and gaming) may also be corresponding to different vibration feedback effects. In addition, touch vibration feedback effects may be user-defined.

The indicator 192 may be an indicator light, may be configured to indicate a charging status and a battery level change, and may also be configured to indicate a message, a missed call, and a notification.

The SIM card interface 195 is configured to connect to a SIM card. The SIM card may be inserted into the SIM card interface 195 to be in contact with the terminal device 100 or removed from the SIM card interface 195 to be separated from the terminal device 100. The terminal device 100 can support one or N SIM card interfaces, where N is a positive integer greater than 1. A plurality of cards may be inserted into one SIM card interface 195. The plurality of cards may be of a same type or of different types. The SIM card interface 195 may also be compatible with an external storage card. The terminal device 100 interacts with a network by using a SIM card, to implement a call function, a data communication function, and the like. In some embodiments, the terminal device 100 uses an embedded-SIM (embedded-SIM, eSIM) card. The eSIM card may be embedded in the terminal device 100 and cannot be separated from the terminal device 100.

Currently, for color correction processing of an image, some manufacturers adjust hue and saturation of the image in an ISP by using a two-dimensional lookup table. However, because the two-dimensional lookup table can only be used to adjust the hue and the saturation, a color with same hue but different brightness cannot be adjusted, in different degrees, based on brightness of the color. Consequently, an image obtained after processing by using the two-dimensional lookup table cannot meet user's requirements in aspects of hue, saturation, and brightness.

In view of this, this application provides an image processing method. An electronic device may determine a first mapping in a three-dimensional lookup table based on a first operation, convert an obtained to-be-processed image in a first color space into a first image in a second color space, process the first image according to the first mapping to obtain a second image in the second color space, and convert the second image into a third image in the first color space to obtain a target image corresponding to the to-be-processed image. According to this embodiment of this application, the to-be-processed image can be processed in aspects of hue, saturation, and brightness according to the first mapping in the three-dimensional lookup table, to improve image quality of an output image.

It should be understood that, the first mapping in the three-dimensional lookup table may alternatively refer to a target three-dimensional lookup table. An image pattern may be determined by using the first mapping in the three-dimensional lookup table, and the image pattern can achieve effects of different filters in a camera.

Figure 2:
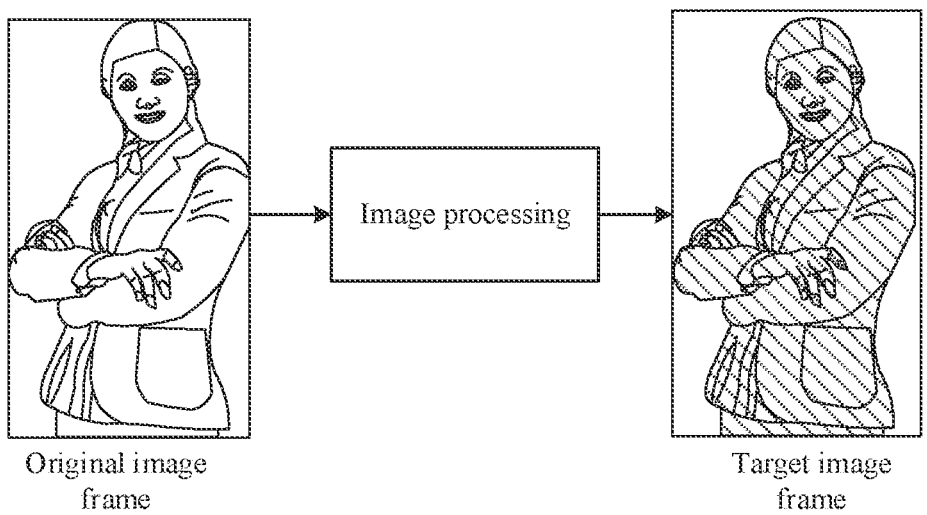
FIG. 2 is a schematic diagram of an application scenario according to an embodiment of this application.

For example, FIG. 2 is a schematic diagram of an application scenario of the image processing method according to an embodiment of this application. The image processing method in this application may be applied to image processing. For example, color correction or image style adjustment may be performed on an original image frame of a video to obtain a target image frame, to achieve various image style effects of the video to meet user's requirements.

For example, the electronic device may obtain the to-be-processed image and the first mapping in the three-dimensional lookup table; convert the to-be-processed image in the first color space into the first image in the second color space, where the to-be-processed image is an image obtained in the first color space; process the first image according to the first mapping to obtain the second image; and convert the second image in the second color space into the third image in the first color space, where the first mapping in the three-dimensional lookup table may be regarded as a function relationship, and color information of each pixel may be re-determined by using the first mapping, to obtain new color information.

The image processing method provided in this embodiment of this application is described in detail below with reference to FIG. 3 to FIG. 21.

Implementation 1

In an example, the image processing method provided in this embodiment of this application may be applied to video shooting. When shooting a video in a movie mode of a camera, a user may manually select a target three-dimensional lookup table for shooting a scene of this video. The target three-dimensional lookup table presented on a user screen may be different filter effects in the camera. Alternatively, the camera may automatically identify a target three-dimensional lookup table for shooting the video. For example, the camera may determine a selected filter based on content of the identified shooting scene, that is, determine the target three-dimensional lookup table. An image signal processor may obtain an image frame and an identifier of the target three-dimensional lookup table. The image signal processor sends the image frame and the identifier of the target three-dimensional lookup table to a camera algorithm library. The camera algorithm library determines the target three-dimensional lookup table, and sends the target three-dimensional lookup table and the image frame to a graphics processing unit or a digital signal processor for image processing to obtain a target image frame.

Figure 3:
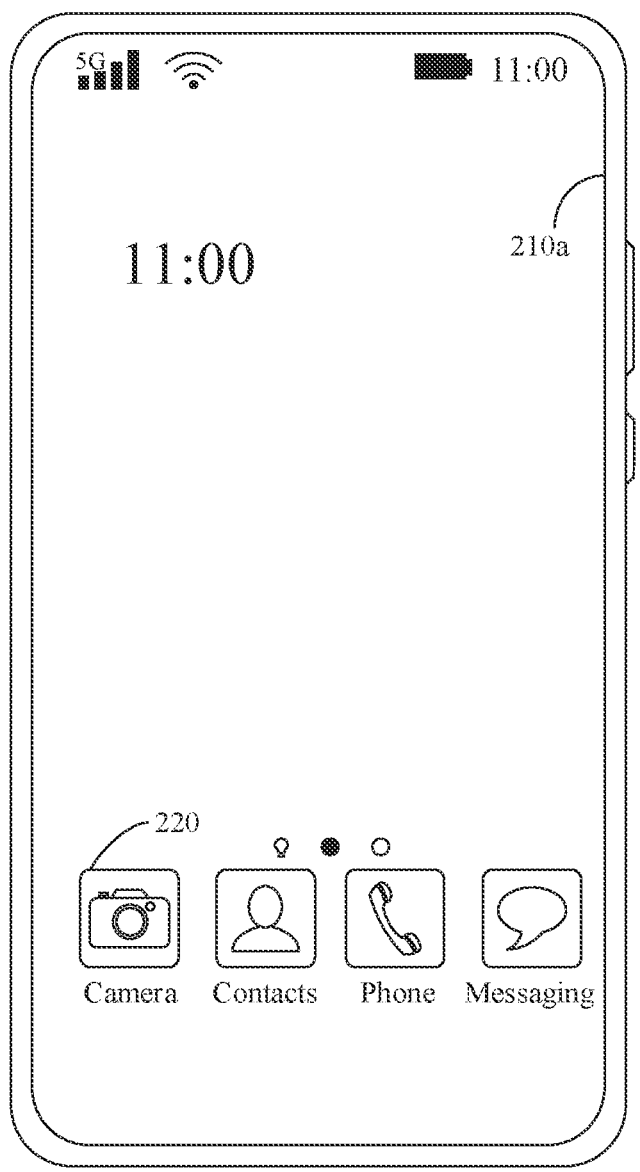
FIG. 3 is a schematic diagram of a display screen of a terminal device according to an embodiment of this application.

For example, FIG. 3 shows a graphical user interface (graphical user interface, GUI) of a terminal device, and the GUI is a home screen 210a of the terminal device. After detecting an operation of taping an icon 220 of a camera application (application, APP) on the home screen 210a by a user, the terminal device may enable the camera application, and display another GUI in FIG. 4. The GUI shown in FIG. 4 may be a display screen of the camera APP in a shooting pattern, and the GUI may include a shooting screen 230. The shooting screen 230 may include a viewfinder frame 231 and a control. For example, the shooting screen 230 may include a control 232 for indicating video recording and a control 233 for indicating an LUT. In a preview state, a preview image may be displayed in real time in the viewfinder frame 231. The preview state may be a state in which the preview image may be displayed in real time in the viewfinder frame when the user enables the camera but does not press a video button. In an example, after the camera application is enabled, a movie mode screen shown in FIG. 4 may be displayed directly.

Figure 4:
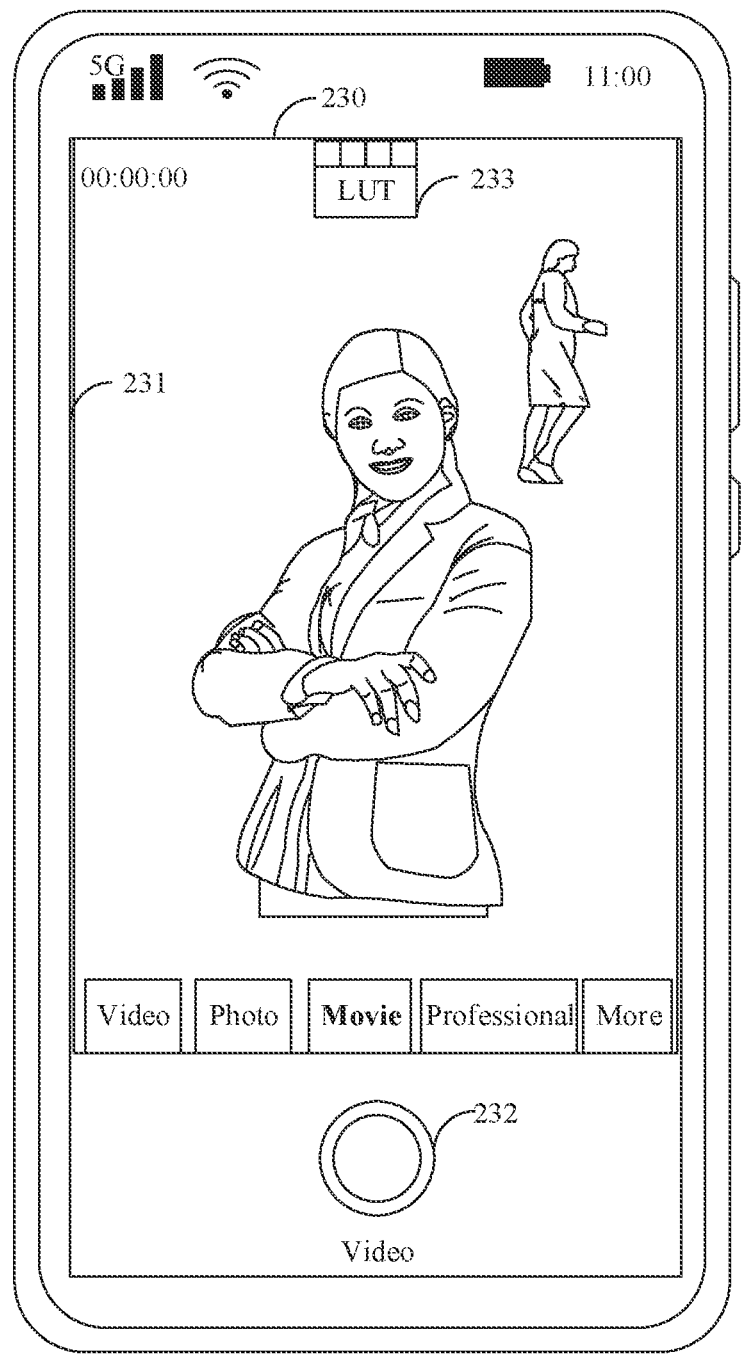
FIG. 4 is a schematic diagram of a display screen of a terminal device according to an embodiment of this application.

In an example, after the camera application is enabled, a shooting mode screen may be displayed. The terminal device may detect an operation of taping a movie mode by the user, and the terminal device enters the movie mode in response to the user's operation, as shown in FIG. 4.

Figure 5:
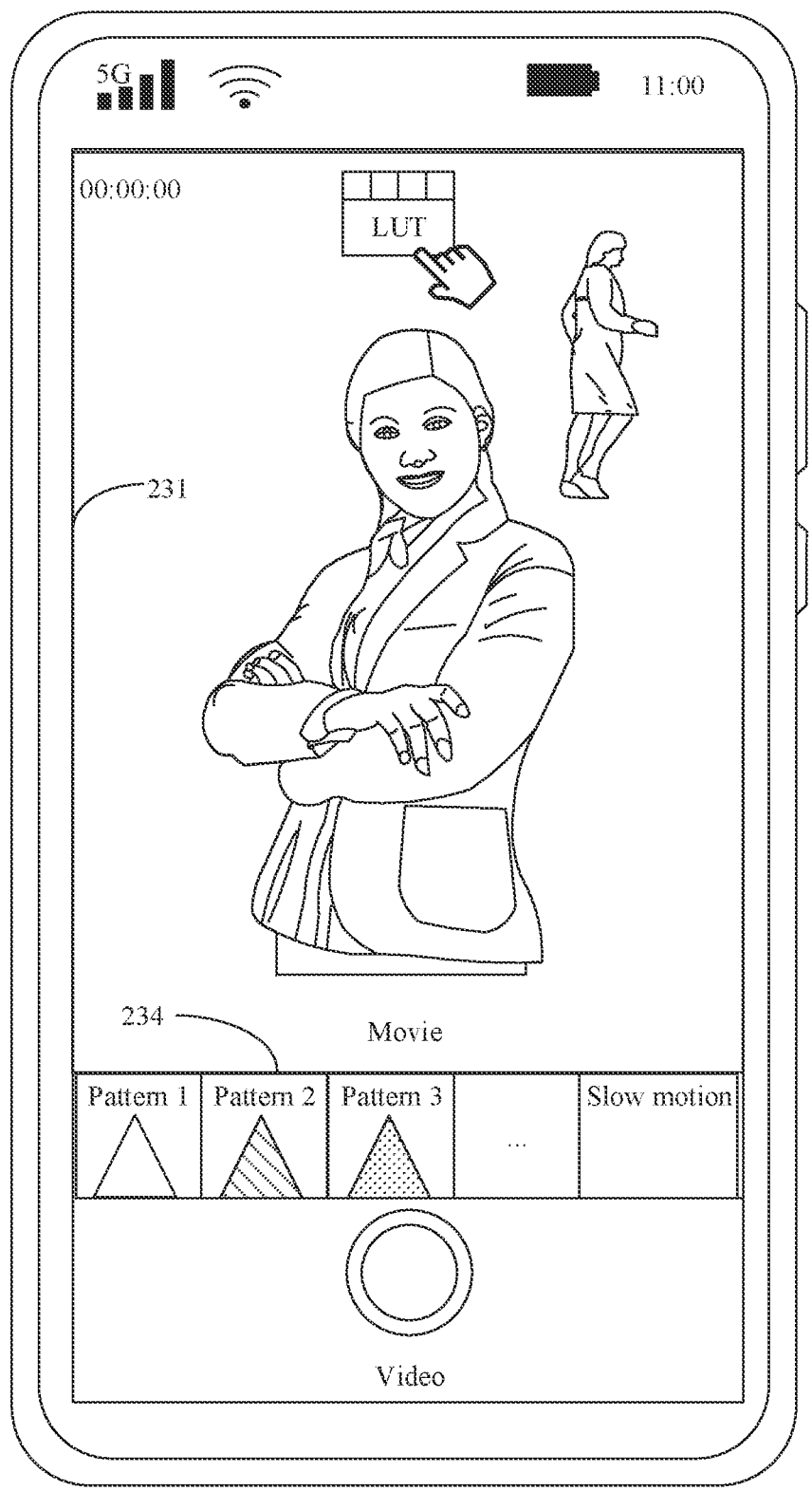
FIG. 5 is a schematic diagram of a display screen of a terminal device according to an embodiment of this application.
Figure 6:
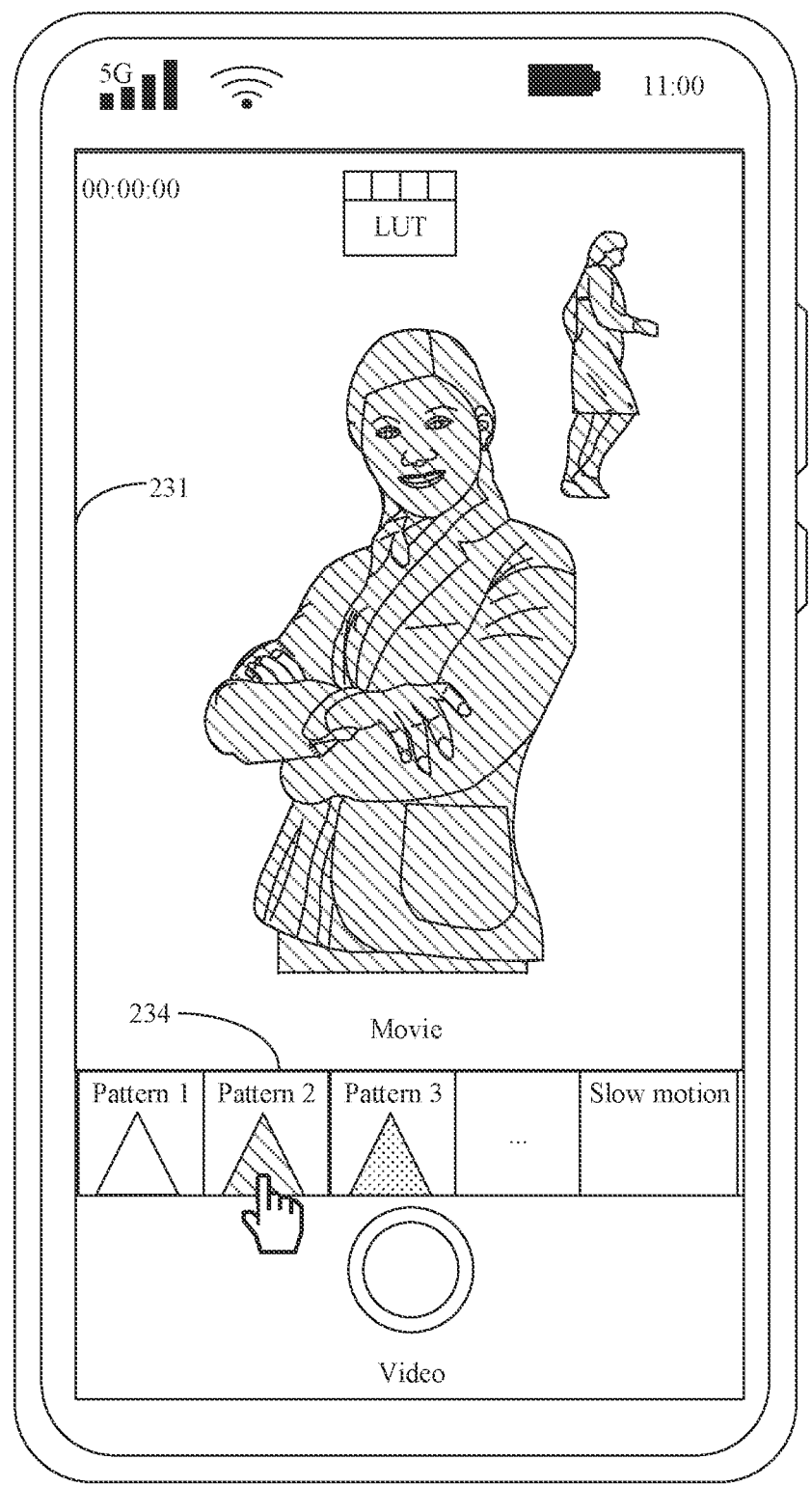
FIG. 6 is a schematic diagram of a display screen of a terminal device according to an embodiment of this application.

As shown in FIG. 5, the terminal device detects an operation of taping the control 233 by the user. A preview box 234 including different image patterns may be displayed on the shooting screen 230 in response to the user's operation, and the preview box 234 may include a pattern 1, a pattern 2, a pattern 3, and the like as well as slow motion. The image patterns may include but are not limited to image patterns such as Hollywood Classics, Superheroes, Happy City, 1990s, Cherry Blossoms of Early Spring, Mysterious Realm, Black and White Phantom, and Warm Light. The slow motion may be used to switch a shooting mode of the camera from the movie mode to a slow motion mode. As shown in FIG. 6, the user may tap the pattern 2, and a preview image displayed in the viewfinder frame 231 is the same as the pattern 2.

In a possible implementation, the electronic device may display a first screen, where the first screen includes a first control; detect a first operation on the first control; and determine a first mapping in a three-dimensional lookup table in response to the first operation. The first screen may be a screen shown in FIG. 5, and the first control may be a control for indicating the pattern 2. The detecting a first operation on a first control may be detecting an operation of taping, by the user, the control for indicating the pattern 2, as shown in FIG. 6. The electronic device may determine, by detecting the first operation on the first control, a target three-dimensional lookup table corresponding to the pattern 2 shown in FIG. 6. To be specific, the target three-dimensional lookup table may refer to the first mapping in the three-dimensional lookup table.

It should be noted that, the foregoing provides the description by using the example in which the first operation is a tap operation. The first operation may alternatively be an operation of selecting the first control according to a voice instruction, or may include another behavior of indicating the electronic device to select the first control. The foregoing provides the description by using the example, and does not constitute any limitation on this application.

In an example, the camera of the terminal device may determine an image pattern of a shooting scene based on the user's tap operation, that is, determine a filter effect of the shooting scene. As shown in FIG. 6, the user may tap the pattern 2, and a preview image displayed in the viewfinder frame 231 is the same as the pattern 2.

Figure 7:
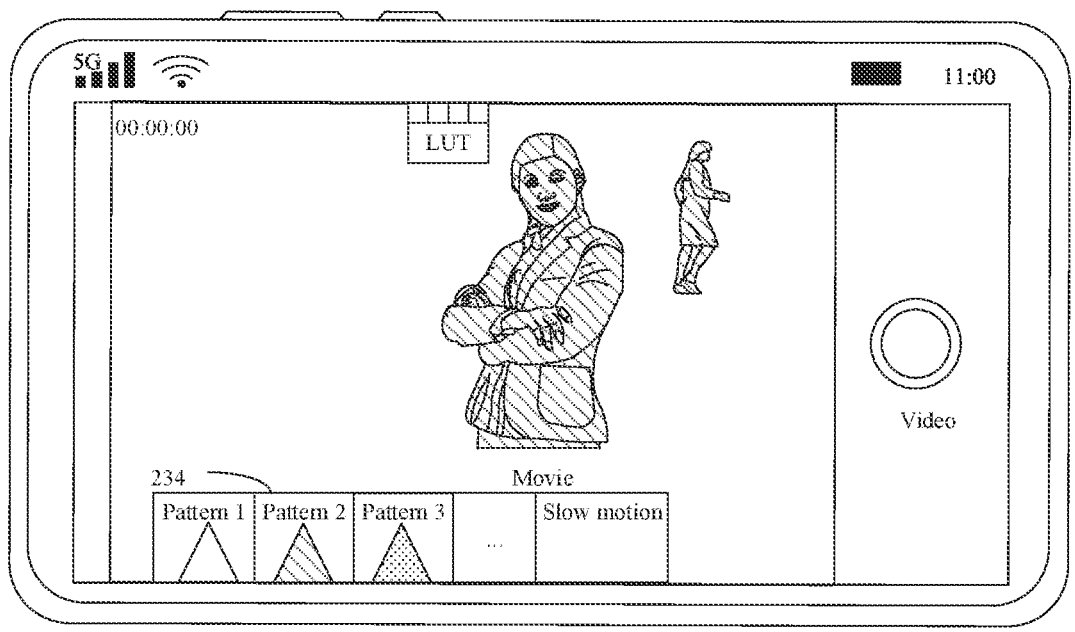
FIG. 7 is a schematic diagram of a display screen of a terminal device according to an embodiment of this application.

It should be understood that, FIG. 6 may be a movie mode screen of the terminal device in portrait mode; FIG. 7 may be a movie mode screen of the terminal device in landscape mode; and the terminal device may determine, based on a state of using the terminal device by the user, to perform display in landscape mode or portrait mode.

It should also be understood that, image patterns displayed in the preview box 234 are described in FIG. 6 and FIG. 7 by using examples. The preview box may further include other image patterns. The image patterns may be corresponding to different filter effects on the display screen. Names of the foregoing image patterns are used as examples for description. This is not limited in this application.

In an example, the camera of the terminal device may automatically recognize a shooting scene based on the shooting scene to determine an image pattern, in other words, the camera may automatically recognize a shooting scene based on the shooting scene to determine a filter effect.

Figure 8:
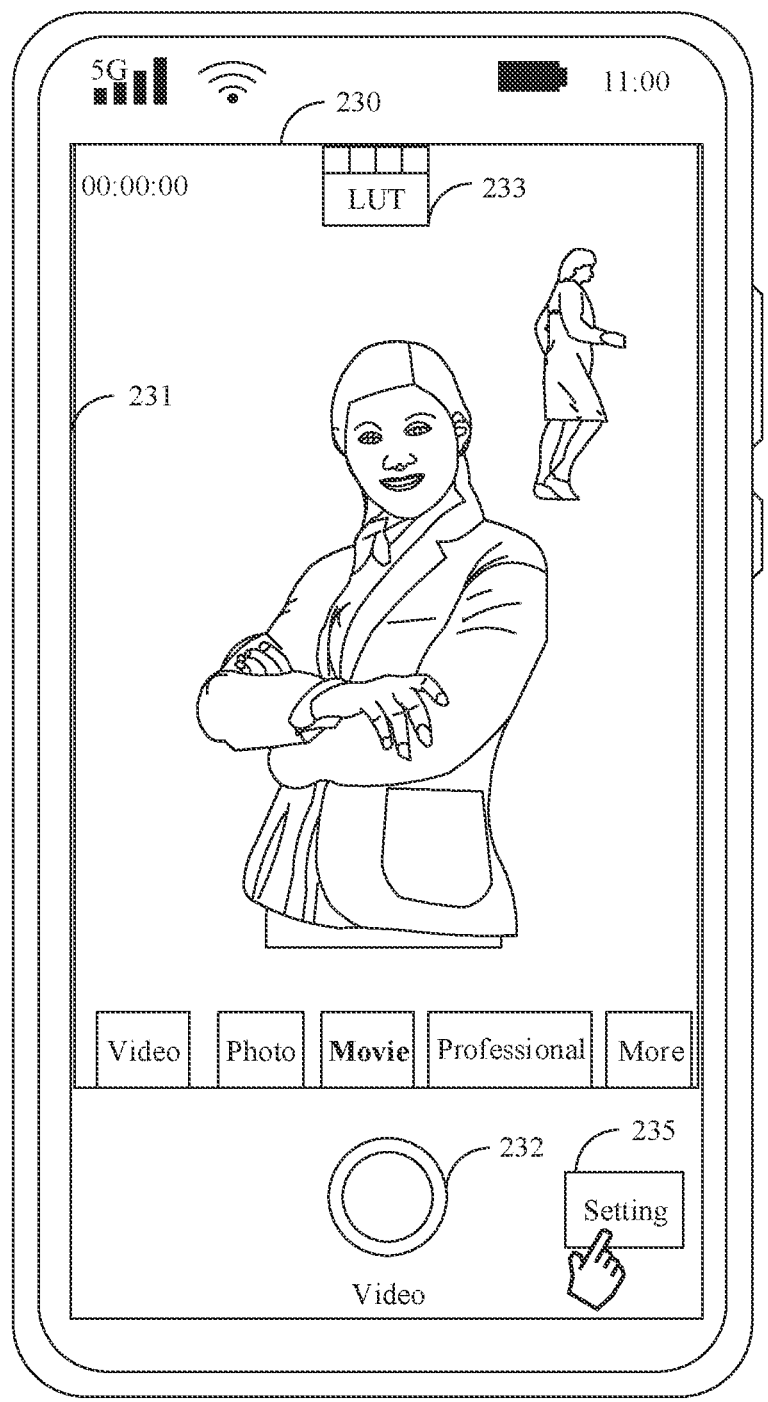
FIG. 8 is a schematic diagram of a display screen of a terminal device according to an embodiment of this application.
Figure 9:
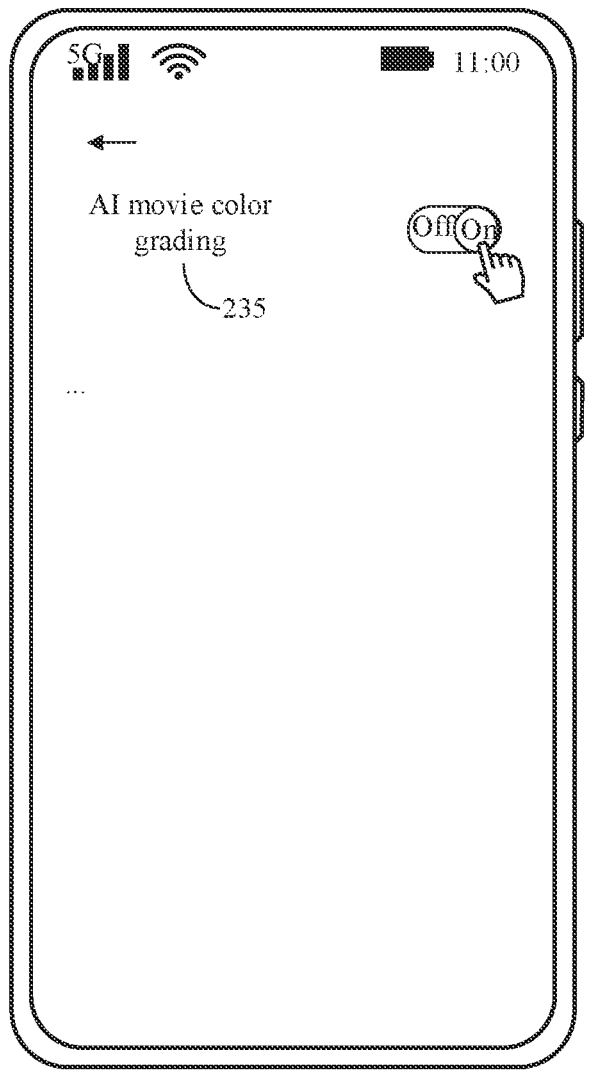
FIG. 9 is a schematic diagram of a display screen of a terminal device according to an embodiment of this application.
Figure 10:
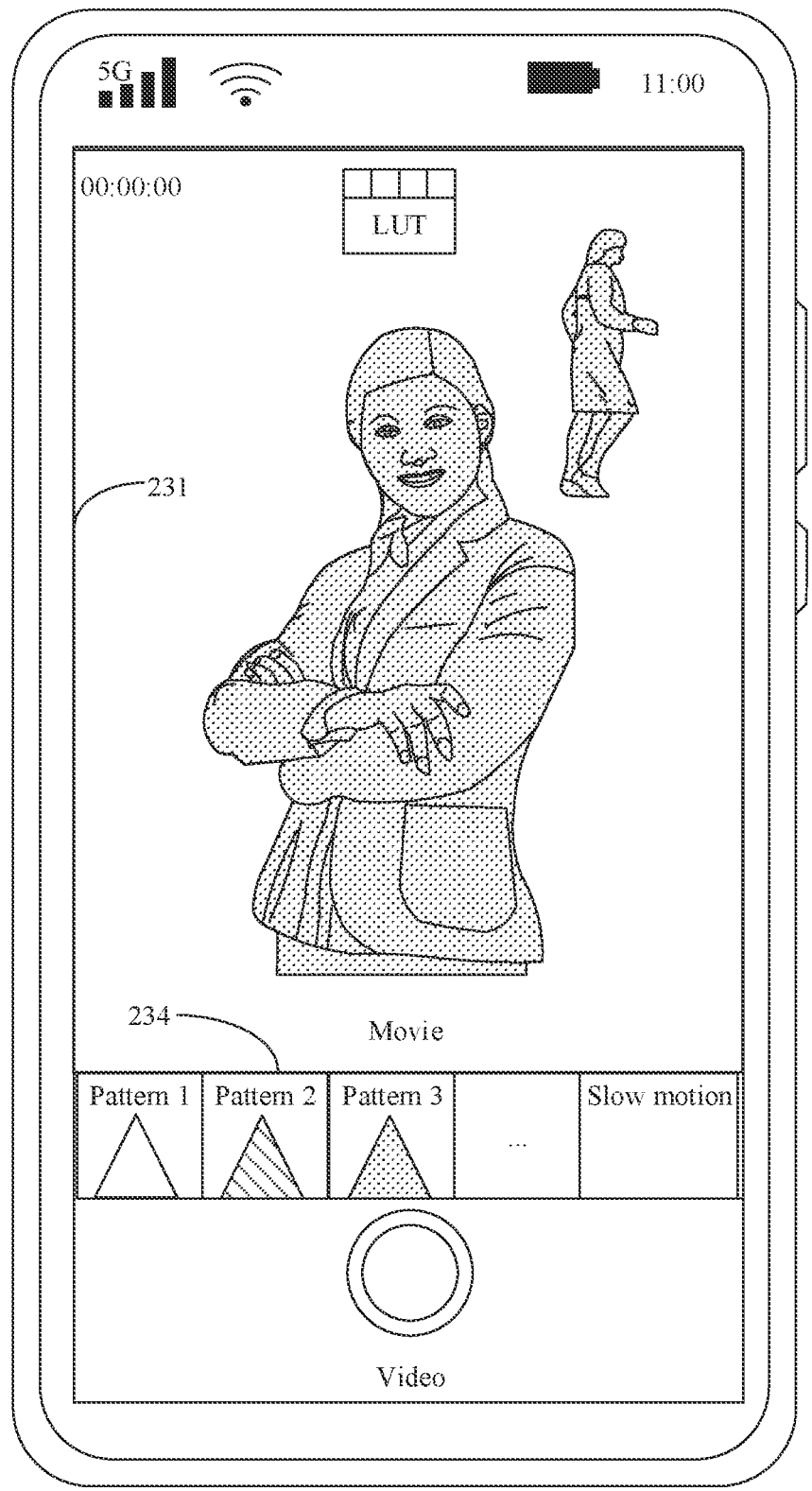
FIG. 10 is a schematic diagram of a display screen of a terminal device according to an embodiment of this application.

For example, the shooting screen 230 shown in FIG. 8 may include a control 235 for setting indication. When an operation of taping the control 235 by the user is detected, a setting screen is displayed in response to the user's operation, as shown in FIG. 9. The setting screen includes an AI movie color grading control 235. It is detected that the user enables an AI movie color grading pattern. After the user enables the AI movie color grading pattern, the user does not need to manually select an image pattern, and the camera may automatically determine, based on a shooting scene, to use an image pattern in a preview box for video shooting. As shown in FIG. 10, the camera determines, based on shooting scene detection, to perform video shooting according to the pattern 3.

In a possible implementation, the electronic device may display a first screen, where the first screen includes a first control; detect a first operation on the first control; and determine a first mapping in a three-dimensional lookup table in response to the first operation. The first screen may be a screen shown in FIG. 9, and the first control may be an AI movie color grading control. The detecting a first operation on a first control may be detecting an operation of determining the pattern 3 by the electronic device based on shooting scene identification, as shown in FIG. 10. The electronic device may determine, by detecting the first operation on the first control, a target three-dimensional lookup table corresponding to the pattern 3 shown in FIG. 10. To be specific, the target three-dimensional lookup table may refer to the first mapping in the three-dimensional lookup table.

Figure 11:
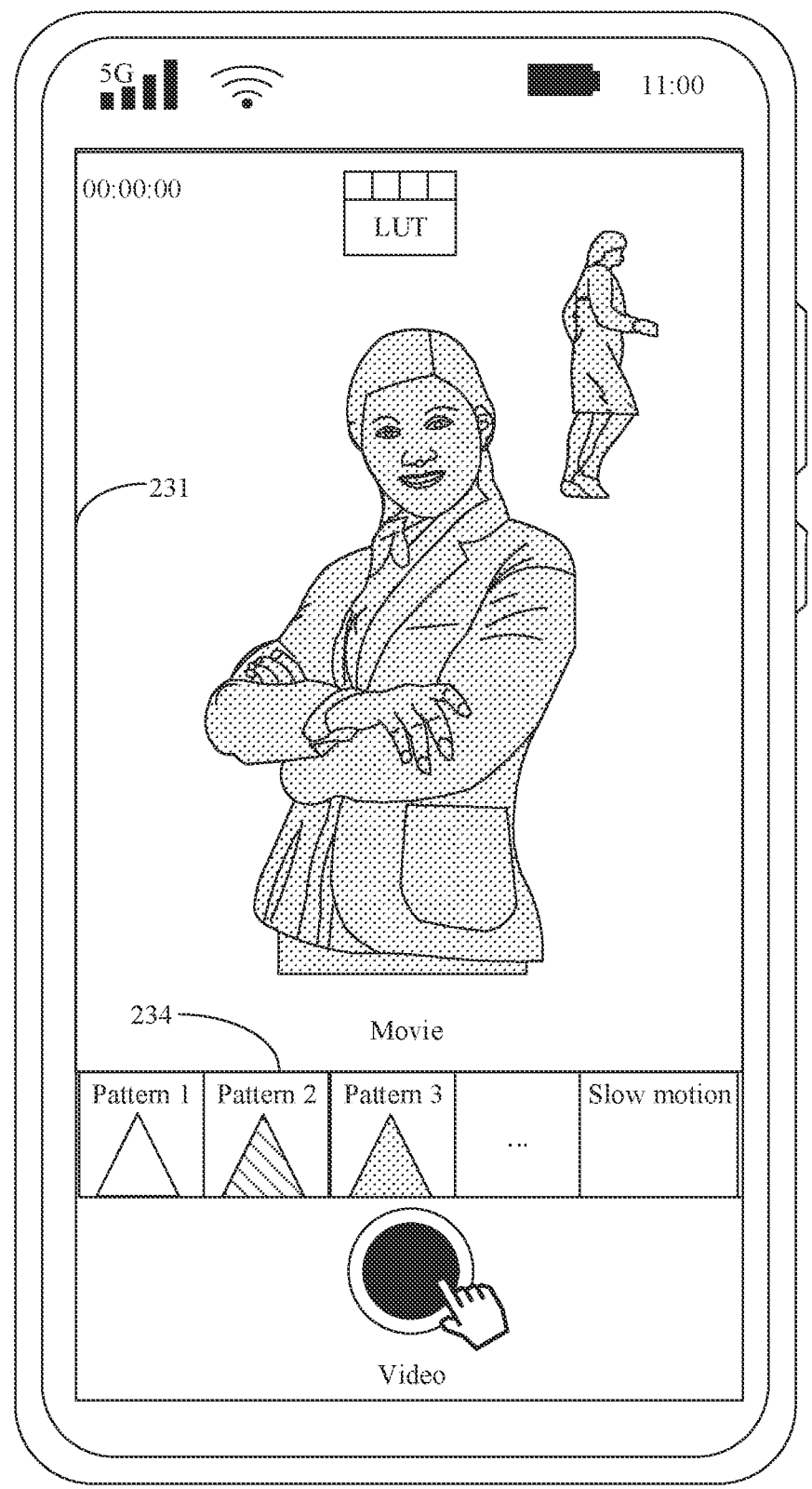
FIG. 11 is a schematic diagram of a display screen of a terminal device according to an embodiment of this application.

As shown in FIG. 11, after determining an image pattern (that is, a filter effect), the terminal device detects a user tap on the control 232 for indicating video recording. The terminal device starts video recording in response to the user's operation, in other words, the terminal device performs video shooting.

It should be understood that, the user's operation of indicating a video recording behavior may include taping, by the user, the control 232 for indicating video recording, may include a user's behavior of indicating, by voice, the terminal device to perform video recording, or may include another user's behavior of indicating the terminal device to perform video recording. The foregoing provides the description by using the example, and does not constitute any limitation on this application.

Figure 12:
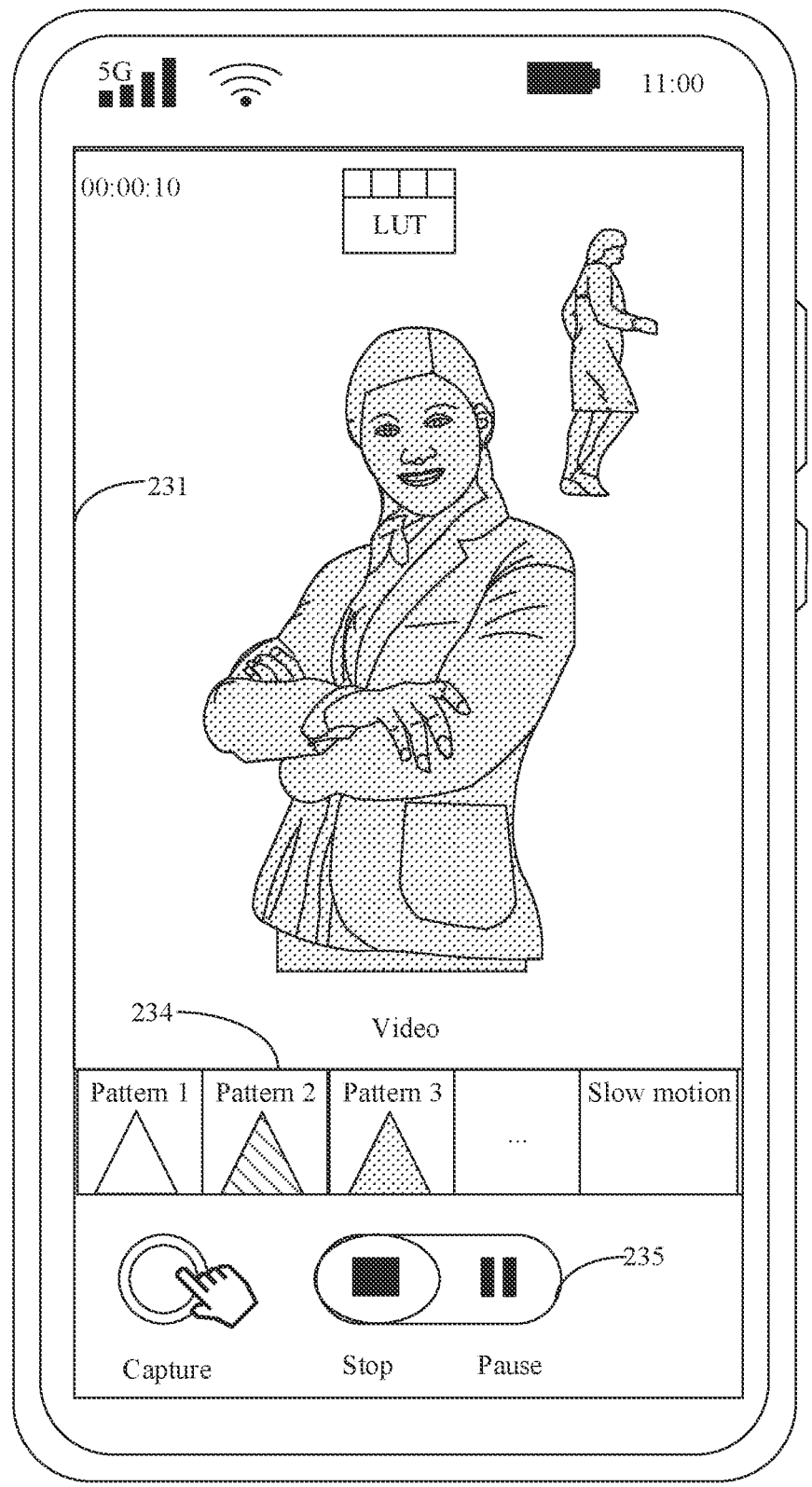
FIG. 12 is a schematic diagram of a display screen of a terminal device according to an embodiment of this application.

In an example, as shown in FIG. 12, the shooting screen 230 may further include a control 235 for indicating stop or pause. During video shooting, an image may be captured by taping a capture control. An image capture mode is the same as a selected video shooting mode.

Graphic display screens on which the user performs operations on the terminal device are described above with reference to FIG. 3 to FIG. 12. An algorithm running on the terminal device is described below with reference to FIG. 13 to FIG. 15.

Figure 13:
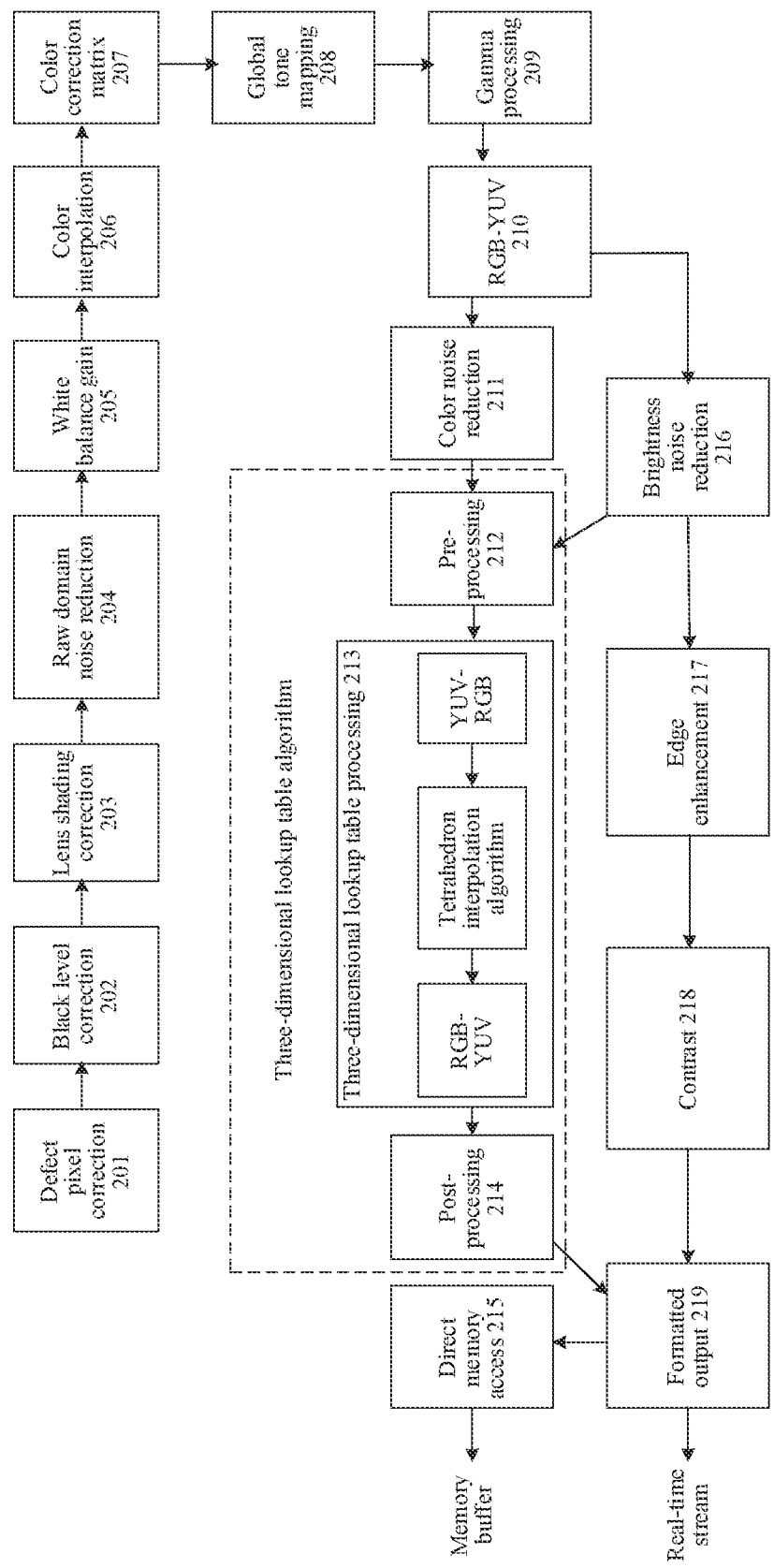
FIG. 13 is a schematic diagram of an image processing method according to an embodiment of this application.

FIG. 13 is a schematic flowchart of an image processing method according to an embodiment of this application.

Defect pixel correction 201 (Defect Pixel Correction, DPC) is used to resolve a defect in an array formed by light points captured on a sensor, or an error in a process of converting a light signal. A defect pixel is usually eliminated by calculating an average of other surrounding pixels in a brightness domain.

Black level correction 202 (Black Level Correction, BLC) is used to correct a black level. The black level is a video signal level at which no line of light is output on a display apparatus that has been calibrated to some extent. Reasons for the black level correction are as follows: On one hand, due to a dark current existing in an image sensor, there is still a pixel voltage output when there is no light irradiation. On the other hand, because the image sensor has insufficient precision during analog-to-digital conversion, for example, using 8 bits (bit) as an example, an effective range of each pixel is 0-255, the image sensor may not be able to convert information close to 0. Based on user's visual characteristics (sensitive to dark details), an image sensor manufacturer may generally add a fixed offset during analog-to-digital conversion to make an output pixel between 5 (non-fixed value) and 255, then transmits the pixel to an ISP for subtraction processing, and adjusts the pixel 5 (non-fixed value) to 0, to make each pixel fall within an effective range of 0-255.

Lens shading correction 203 (Lens Shading Correction, LSC) is used to eliminate color and brightness inconsistency caused between a periphery of an image and a center of the image due to a lens optical system.

Noise reduction 204 may be Raw domain noise reduction. The Raw domain noise reduction is used to reduce noise in an image. The noise in the image affects user's visual experience. Therefore, image quality of the image can be improved to some extent through noise reduction.

Auto white balance 205 (Auto White Balance, AWB) is used to make a camera to restore white at any color temperature to white. Due to the influence of color temperature, a piece of white paper becomes yellowish at low color temperature and bluish at high color temperature. The white balance is intended to make a white object meet R=G=B at any color temperature and appear white.

Color interpolation 206 is used to allow each pixel to have three components RGB. Color correction matrix 207 (Color Correction Matrix, CCM) is used to calibrate accuracy of a color other than white. Global tone mapping 208 (Global Tone Mapping, GTM) is used to resolve a problem of uneven distribution of grayscale values in a high dynamic image. Gamma processing 209 is used to adjust brightness, contrast, a dynamic range, and the like of an image by adjusting a gamma curve. RGB-YUV 210 is used to convert an image in an RGB color space into an image in a YUV color space. Color noise reduction 211 is used to perform hue and saturation denoising on the image in the YUV color space.

Pre-processing 212 (an example of first processing) is used to adjust a width of a YUV image. For example, if an image in a YUV color space does not meet a 128-byte alignment constraint, in other words, an image width of the image is not an integer multiple of 128, the image width may be adjusted.

Three-dimensional lookup table processing 213 is used to perform color correction processing on an input image frame based on a three-dimensional lookup table. YUV-RGB refers to converting an image in a YUV color space into an image in an RGB color space. RGB-YUV refers to converting an image in the RGB color space into an image in the YUV color space.

Post-processing 214 (an example of second processing) may be used to resize an output image to a same format as an input image when an image format of the output image does not meet the 128-byte alignment constraint.

Direct memory access 215 is used to implement interaction between hardware devices of different speeds. Brightness noise reduction 216 is used to perform brightness denoising on the image in the YUV color space. Edge enhancement 217 is used to highlight, enhance, and improve boundaries and contours between different grayscale areas in the image. Contrast 218 is used to adjust contrast of an excessively dark image or an excessively bright image to make the image more vivid. Formatted output 219 is used to output images in different formats.

In this embodiment of this application, an electronic device may convert a to-be-processed image in a first color space into a first image in a second color space, where the to-be-processed image is an image obtained in the first color space; process the first image based on a first mapping in a three-dimensional lookup table to obtain a second image; and convert the second image in the second color space into a third image in the first color space.

In an example, as shown in FIG. 13, the first color space may be a YUV color space, and the second color space may be an RGB color space.

For example, as shown in FIG. 13, the to-be-processed image may be an image output after processing through the color noise reduction 211. The converting a to-be-processed image in a first color space into a first image in a second color space may be: performing the pre-processing 212 on the image output after the color noise reduction 211, to obtain a pre-processed image, and converting the pre-processed image in the YUV color space into an image in the RGB color space.

For example, as shown in FIG. 13, the to-be-processed image may be an image output after processing through the color noise reduction 211. The converting a to-be-processed image in a first color space into a first image in a second color space may be directly converting the image that is output after the color noise reduction 211 and that is in the YUV color space into an image in the RGB color space.

For example, as shown in FIG. 13, the processing the first image based on a first mapping in a three-dimensional lookup table to obtain a second image may be mapping an image in the RGB color space by using a tetrahedron interpolation algorithm during the three-dimensional lookup table processing 213, to obtain a mapped image in the RGB color space.

For example, as shown in FIG. 13, the converting the second image in the second color space into a third image in the first color space may be converting, from the RGB color space into the YUV color space, the image in the RGB color space mapped by using the tetrahedron interpolation algorithm during the three-dimensional lookup table processing 213.

It should be understood that, the first mapping in the three-dimensional lookup table may alternatively refer to a target three-dimensional lookup table. An image pattern may be determined by using the first mapping in the three-dimensional lookup table, and the image pattern can achieve effects of different filters in a camera.

It should also be understood that, the foregoing provides the description by using the YUV color space and the RGB color space as examples. The first color space and the second color space in this application may be different color spaces, and the first color space and the second color space are not specifically limited.

In this embodiment of this application, the electronic device may determine the first mapping in the three-dimensional lookup table based on the first operation, convert the obtained to-be-processed image in the first color space into the first image in the second color space, process the first image according to the first mapping to obtain the second image in the second color space, and convert the second image into the third image in the first color space to obtain a target image corresponding to the to-be-processed image. According to this embodiment of this application, the to-be-processed image can be processed in aspects of hue, saturation, and brightness according to the first mapping in the three-dimensional lookup table, to improve image quality of an output image.

Figure 14:
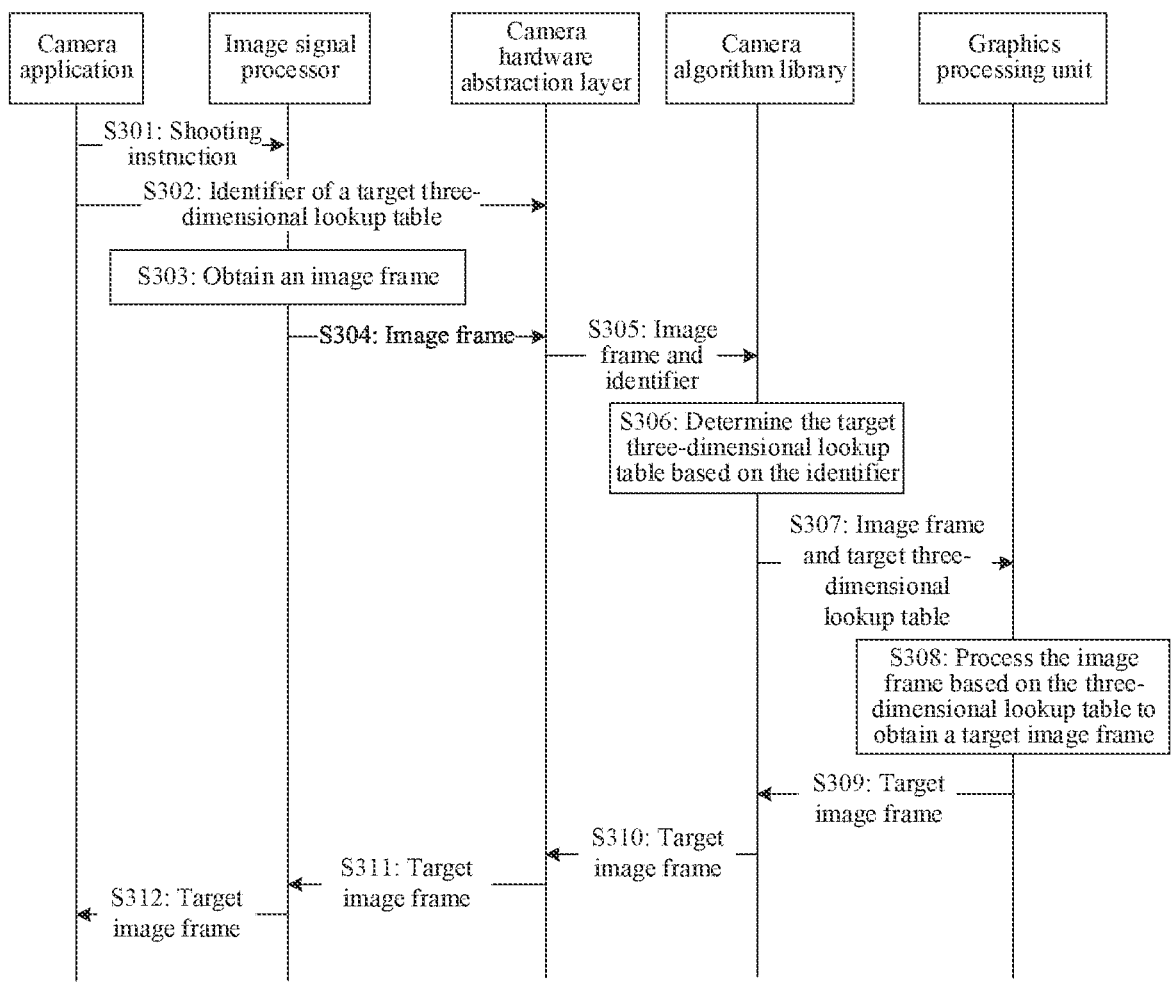
FIG. 14 is an interactive schematic diagram of an image processing method according to an embodiment of this application.

FIG. 14 is a schematic interaction diagram of an image processing method according to an embodiment of this application. The method 300 includes step S301 to step S312, and these steps are described in detail below.

Step S301: A camera application sends a shooting instruction.

In an example, a terminal device detects an operation of taping the camera application by a user, and the camera runs in response to the user's operation; and after the camera application runs, in a movie mode of the camera, the terminal device detects an operation of taping a video recording control by the user, and in response to the user's operation, the camera application may send, to an image signal processor, a first instruction for instructing the image signal processor to obtain an image signal.

Figure 15:
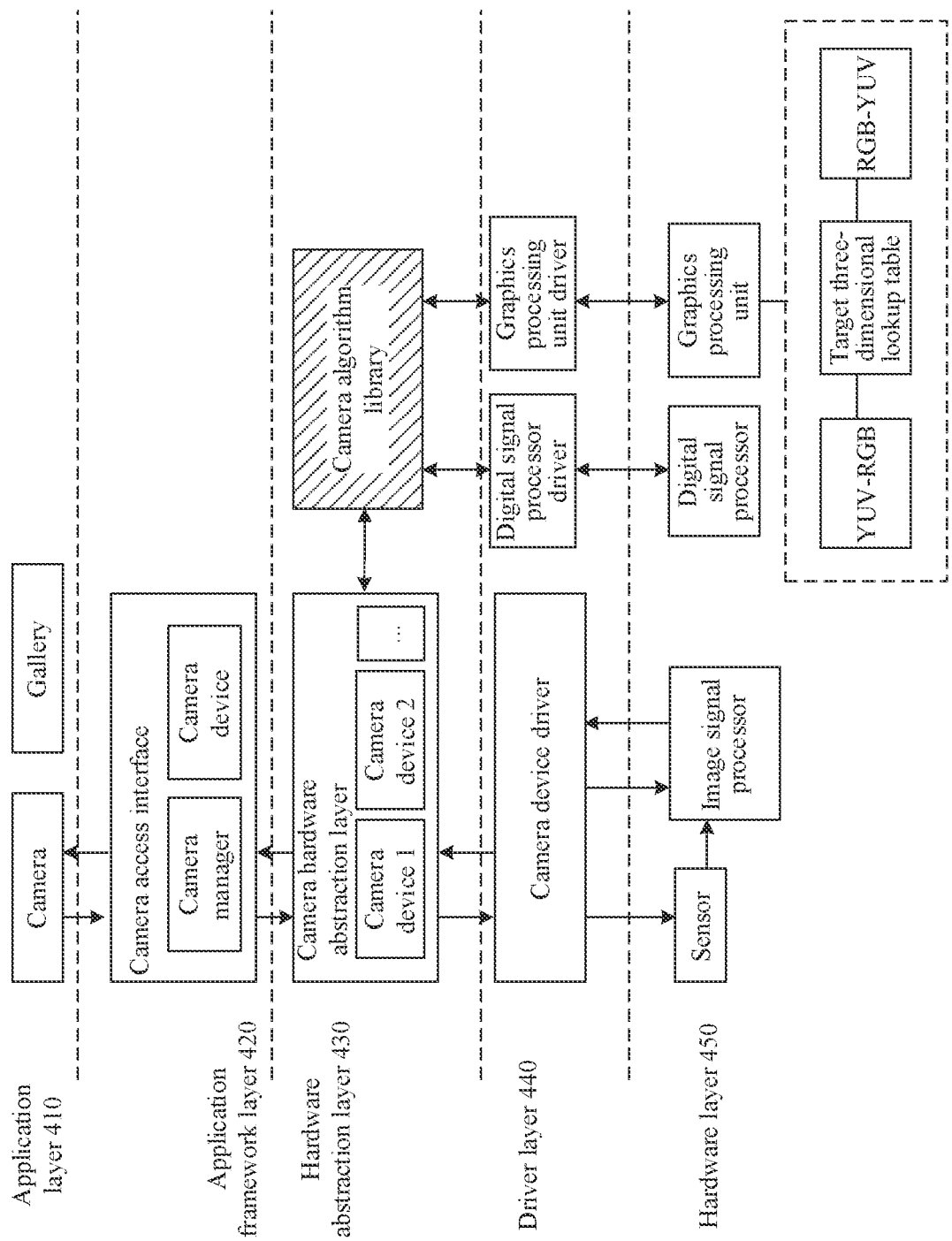
FIG. 15 is a schematic diagram of a system architecture according to an embodiment of this application.

For example, as shown in FIG. 15, the user delivers the shooting instruction. The shooting instruction may be transmitted to a hardware layer 450 after passing through an application layer 410, an application framework layer 420, a hardware abstraction layer 430, and a driver layer 440. After receiving the shooting instruction, the image signal processor obtains an image frame.

Step S302: The camera application sends an identifier of a target three-dimensional lookup table to a camera hardware abstraction layer.

In an example, the terminal device detects a first operation of taping the target three-dimensional lookup table on a display screen of the camera, and the camera application may obtain a target pattern based on the first operation of the user.

In an example, the terminal device detects a first operation of setting, by the user, the camera to automatically recognize a shooting scene to determine a target three-dimensional lookup table, and the camera automatically determines a target pattern based on the first operation.

It should be understood that, the target pattern is corresponding to a target three-dimensional lookup table. The target pattern may refer to a mapping in the three-dimensional lookup table. For example, the target pattern may refer to a first mapping in the three-dimensional lookup table.

For example, after determining the target pattern, the camera application may transmit the identifier of the target three-dimensional lookup table from the application layer 410 to the application framework layer 420 and then from the application framework layer 420 to the hardware abstraction layer 430.

Step S303: Obtain the image frame.

For example, after detecting the operation of taping the video recording control by the user, the image signal processor may obtain an image currently displayed in a preview box on the display screen of the camera.

Step S304: Send the image frame to the camera hardware abstraction layer.

It should be understood that, the camera hardware abstraction layer is located at the hardware abstraction layer. The hardware abstraction layer includes the camera hardware abstraction layer and an abstraction layer of another hardware device. The hardware abstraction layer is located at an interface layer between an operating system kernel and a hardware circuit, and is used for hardware abstraction. For details thereof, refer to a system architecture shown in FIG. 15 in the following.

For example, as shown in FIG. 15, the user delivers the shooting instruction. The shooting instruction may be transmitted to the hardware layer 450 after passing through the application layer 410, the application framework layer 420, the hardware abstraction layer 430, and the driver layer 440. The image signal processor receives the shooting instruction to obtain a to-be-processed image frame. The image signal processor sends the obtained image frame to the hardware abstraction layer 430 through the driver layer 440.

Step S305: The camera hardware abstraction layer sends the image frame and the identifier of the target three-dimensional lookup table to a camera algorithm library.

It may be understood that, the image frame and the identifier may be sent simultaneously or separately.

Step S306: The camera algorithm library determines the target three-dimensional lookup table based on the identifier of the target three-dimensional lookup table.

It should be understood that, the camera algorithm library may include algorithm instructions such as a camera algorithm and an image algorithm and perform some image processing steps.

For example, the camera algorithm library may perform the pre-processing 212 and the post-processing 214 shown in FIG. 13 on the obtained image frame. The pre-processing may be adjusting a width of the image frame, for example, adjusting the width of the image frame to a multiple of 128. The post-processing is adjusting a width of a target image frame output from a graphics processing unit to make the width of the output target image frame be the same as the width of the image frame.

It should also be understood that, the camera algorithm library may include parameters of three-dimensional lookup tables corresponding to all image patterns (that is, filter effects) in a movie mode. For example, if the movie mode may include filter effects corresponding to eight image patterns, the camera algorithm library includes a three-dimensional lookup table corresponding to each of the eight filter effects.

In this embodiment of this application, the camera algorithm library may load a three-dimensional lookup table algorithm. For example, when the camera application starts the movie mode, the three-dimensional lookup table algorithm starts to be loaded. When the camera application switches to another mode, the three-dimensional lookup table algorithm may be released.

Step S307: The camera algorithm library sends the image frame and the target three-dimensional lookup table to the graphics processing unit.

Step S308: The graphics processing unit processes the image frame based on the target three-dimensional lookup table to obtain a target image frame.

In an example, the graphics processing unit may perform image processing on the image frame based on the target three-dimensional lookup table and a tetrahedron interpolation algorithm to obtain the target image frame.

For example, the obtained image frame may be an image frame in a YUV color space. The graphics processing unit may convert the image frame in the YUV color space into an image frame in an RGB color space. The target three-dimensional lookup table may be a table corresponding to a mapping from one three-dimensional color space to another three-dimensional color space. The image frame may be processed based on the target three-dimensional lookup table by using the tetrahedron interpolation algorithm. The tetrahedron interpolation algorithm may include the following steps:

Step 1: Construct a three-dimensional color space based on a parameter in the target three-dimensional lookup table, and divide the three-dimensional color space evenly to obtain a plurality of cubes. For example, each dimension of the three-dimensional space may be divided into 32 parts evenly to obtain 33×33×33 cubes.

Step 2: Obtain a pixel value of a pixel from the image frame in the RGB color space, and determine, based on the pixel value, a cube that is in the three-dimensional color space and that is closest to the pixel.

Step 3: Determine, from eight vertices of the cube, four vertices closest to the pixel value.

Step 4: Perform weighted averaging processing on pixel values of the four vertices to obtain a pixel value to which the pixel is mapped, and successively traverse all pixels in the image frame for performing the tetrahedron interpolation algorithm processing to obtain a target image frame.

Step S309: The graphics processing unit sends the target image frame to the camera algorithm library.

Step S310: The camera algorithm library sends the target image frame to the camera hardware abstraction layer.

Step S311: The camera hardware abstraction layer sends the target image frame to the image signal processor.

Step S312: The image signal processor sends the target image frame to the camera application.

For example, after receiving the target image frame, the camera application displays the target image frame on the display screen of the camera.

It may be understood that, alternatively, step S311 may not be performed, and the camera hardware abstraction layer sends the target image frame to the camera application.

It should be understood that, the foregoing provides the description by using the process of processing the image frame based on the target three-dimensional lookup table in the GPU as an example. The process of processing the image frame based on the target three-dimensional lookup table may alternatively be performed in the DSP or another target processor. The target processor may be a processor that supports parallel computing for image processing and is independent of an image signal processing ISP chip.

In this embodiment of this application, the three-dimensional lookup table algorithm may be run in the electronic device, and the image frame is processed by using the three-dimensional lookup table algorithm to obtain the target image frame. The camera hardware abstraction layer may obtain the image frame and the identifier of the target three-dimensional lookup table. The camera hardware abstraction layer may send the image frame and the target three-dimensional lookup table to the GPU or the DSP. The GPU or the DSP processes the image frame based on the target three-dimensional lookup table to obtain the target image frame. The three-dimensional lookup table algorithm in this embodiment of this application may be used to replace a process of processing an image frame by using a two-dimensional lookup table in a hardware device ISP. In addition, compared with using the two-dimensional lookup table, the image processing method in this embodiment of this application can process the image frame in aspects of hue, saturation, and brightness to improve image quality.

FIG. 15 is a schematic diagram of data flow transmission in an image processing method according to an embodiment of this application.

As shown in FIG. 15, the system architecture may include an application layer 410, an application framework layer 420, a hardware abstraction layer 430, a driver layer 440, and a hardware layer 450.

The application layer 410 may include applications such as Camera, Gallery, Calendar, Phone, Map, Navigation, WLAN, Bluetooth, Music, Video, and Messaging.

The application framework layer 420 provides application programming interfaces (application programming interface, API) and a programming framework for applications at the application layer. The application framework layer may include some predefined functions.

For example, the application framework layer 420 may include a camera access interface. The camera access interface may include a camera manager and a camera device. The camera manager may be configured to provide an access interface for camera management. The camera device may be configured to provide an interface for camera access.

The hardware abstraction layer 430 is configured to perform hardware abstraction. For example, the hardware abstraction layer may include a camera hardware abstraction layer and abstraction layers of other hardware devices. The camera hardware abstraction layer may include a camera device 1, a camera device 2, and the like. The camera hardware abstraction layer may be connected to a camera algorithm library, and the camera hardware abstraction layer may invoke an algorithm in the camera algorithm library.

For example, the camera algorithm library may include algorithm instructions such as a camera algorithm and an image algorithm and perform some image processing steps. For example, the camera algorithm library may perform the pre-processing 212 and the post-processing 214 shown in FIG. 13 on the obtained image frame. The pre-processing is adjusting an image width of the image frame, for example, adjusting the width of the image frame to a multiple of 128. The post-processing is adjusting a width of a target image frame output from a graphics processing unit to make the width of the output target image frame be the same as the width of the input image frame.

In an example, the camera algorithm library may also be configured to perform one or more of the following:

pre-storing a plurality of three-dimensional lookup table files, where different three-dimensional lookup table files are corresponding to different image patterns on a display screen; and making an identifier of a target three-dimensional lookup table correspond to a GPU or a DSP, that is, determining the GPU or DSP corresponding to the identifier of the target three-dimensional lookup table.

The driver layer 440 is configured to provide drivers for different hardware devices. For example, the driver layer may include a camera driver, a digital signal processor driver, and a graphics processing unit driver.

The hardware layer 450 may include sensors, an image processor, a digital signal processor, a graphics processing unit, and other hardware devices.

For example, with reference to FIG. 15, the image processing method provided in the embodiments of this application is described below by using a video shooting scene as an example.

A user taps a camera application installed on a terminal device, and the camera application is started in response to the user's tap operation. In the camera application, it is detected that the user selects a movie mode. When the movie mode is started, the camera algorithm library may load the three-dimensional lookup table algorithm provided in this embodiment of this application. For example, the camera algorithm library may load a plurality of pre-stored three-dimensional lookup table files. In the movie mode, the user may select a target filter effect, or the camera determines a target filter effect through automatic recognition, where the target filter effect is corresponding to a target three-dimensional lookup table. A display screen of the terminal device may display a preview image corresponding to the target image pattern. The user taps a control for indicating video recording in the camera application to trigger the camera application to send a shooting instruction to an image signal processor through the camera access interface, the camera hardware abstraction layer, the camera device driver, and the sensor. The image signal processor obtains an image frame, and sends the image frame and an identifier of the target three-dimensional lookup table to the camera algorithm library through the camera device driver and the camera hardware abstraction layer. In addition, the camera application determines the identifier of the target three-dimensional lookup table in response to a first operation of the user, and sends the identifier of the target three-dimensional lookup table to the camera hardware abstraction layer. After obtaining the identifier of the target three-dimensional lookup table, the camera hardware abstraction layer sends the identifier of the target three-dimensional lookup table to the camera algorithm library. The camera algorithm library may determine, based on the identifier of the target three-dimensional lookup table, a group of parameters from the plurality of pre-stored three-dimensional lookup table files, and select a version function of a GPU or a DSP based on performance or other requirements. The camera algorithm library may further perform pre-processing on the obtained image frame, for example, the pre-processing may be adjusting an image width of the image frame. The camera algorithm library sends a pre-processed image frame and a parameter in the target three-dimensional lookup table to the GPU through GPU driver. After obtaining the image frame and the parameter in the target three-dimensional lookup table, the GPU may perform color correction processing on the image frame based on the target three-dimensional lookup table to obtain a target image frame. For example, the obtained image frame may be an image frame in a YUV color space. The GPU may convert the image frame in the YUV color space into an image frame in an RGB color space; process the image frame in the RGB color space based on the target three-dimensional lookup table and a tetrahedron interpolation algorithm to obtain a processed image in the RGB color space; and then convert the processed image in the RGB color space into an image in the YUV color space to obtain a target image frame. The GPU sends the target image frame to the camera algorithm library through the GPU driver. After receiving the target image frame, the camera algorithm library may perform post-processing on the target image frame based on a format of the target image frame. For example, when a width of the target image frame does not meet a preset condition, the format of the target image frame is adjusted. For example, if a format of an input image frame does not meet a 128-byte alignment constraint, a format of an output target image frame may be adjusted to be the same as the format of the input image frame. The camera algorithm library sends the target image frame to the image signal processor through the camera hardware abstraction layer and the camera device driver. The image signal processor sends the target image frame to the camera application through the camera device driver, the camera device hardware layer, and the camera access interface. The camera application displays the target image frame.

In an example, a video obtained in a video scene may include a plurality of image frames. After a target filter effect is determined, the camera algorithm library may determine a target three-dimensional lookup table and send the target three-dimensional lookup table to the GPU. Before switching to the target filter effect is performed, the camera algorithm library may send the target three-dimensional lookup table to the GPU when sending the first image frame. During subsequent image processing on another image frame by using the target three-dimensional lookup table, the camera algorithm library may not need to send the target three-dimensional lookup table again, and may send an instruction to the GPU to enable the GPU to continue to use the target three-dimensional lookup table. When switching to the target filter effect is performed, after receiving an identifier of a switched-to target three-dimensional lookup table, the camera algorithm library needs to re-determine the target three-dimensional lookup table, and sends the switched-to target three-dimensional lookup table to the GPU.

It should be understood that, the foregoing provides the description by using the process of processing the image frame based on the target three-dimensional lookup table in the GPU as an example. The process of processing the image frame based on the target three-dimensional lookup table may alternatively be performed in the DSP or another target processor. The target processor may be a processor that supports parallel computing for image processing and is independent of an image signal processing ISP chip.

In this embodiment of this application, the hardware abstraction layer of the terminal device may obtain the image frame and the identifier of the target three-dimensional lookup table; and may determine the target three-dimensional lookup table based on the identifier of the three-dimensional lookup table and send the original image frame and the target three-dimensional lookup table to a target processor. The target processor may perform image processing on the original image frame based on the target three-dimensional lookup table to obtain the target image frame. In this embodiment of this application, the target processor independent of the ISP chip may perform image processing on the image frame based on the target three-dimensional lookup table. Therefore, when the chip is limited, image processing may be performed on the original image frame in aspects of hue, saturation, and brightness to improve image quality of the target image frame. In addition, the target processor can support parallel computing, in other words, the target processor may perform parallel processing on a plurality of pixels in the image frame based on the target three-dimensional lookup table. Therefore, a running time of image processing can be shortened while the image quality is improved, improving efficiency of the image processing.

In an embodiment, the user may send an image processing instruction to the camera algorithm library by using a gallery application, to invoke the three-dimensional lookup table algorithm in the camera algorithm library to perform image processing on a video to obtain a target video. The following provides a detailed description with reference to an implementation 2.

Implementation 2

In an embodiment, a user may obtain a shot video from a gallery, and send the shot video and an identifier of a target three-dimensional lookup table to a camera algorithm library. The camera algorithm library determines the target three-dimensional lookup table, and sends the target three-dimensional lookup table and the shot video to a graphics processing unit or a digital signal processor for image processing to obtain a target video.

Figure 16:
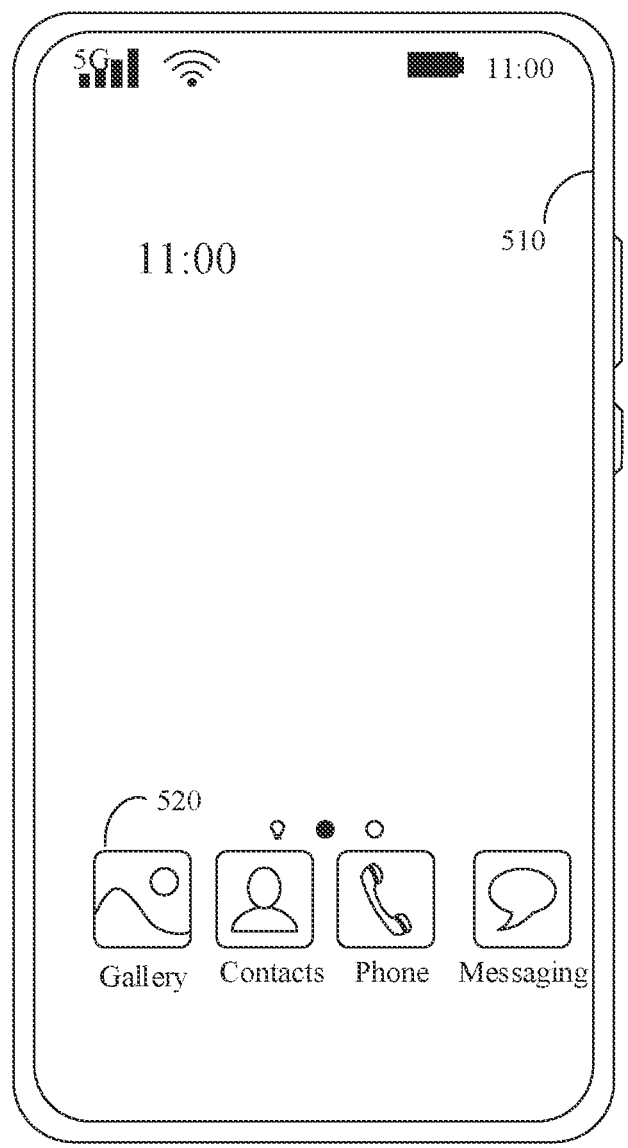
FIG. 16 is a schematic diagram of a display screen of a terminal device according to an embodiment of this application.
Figure 17:
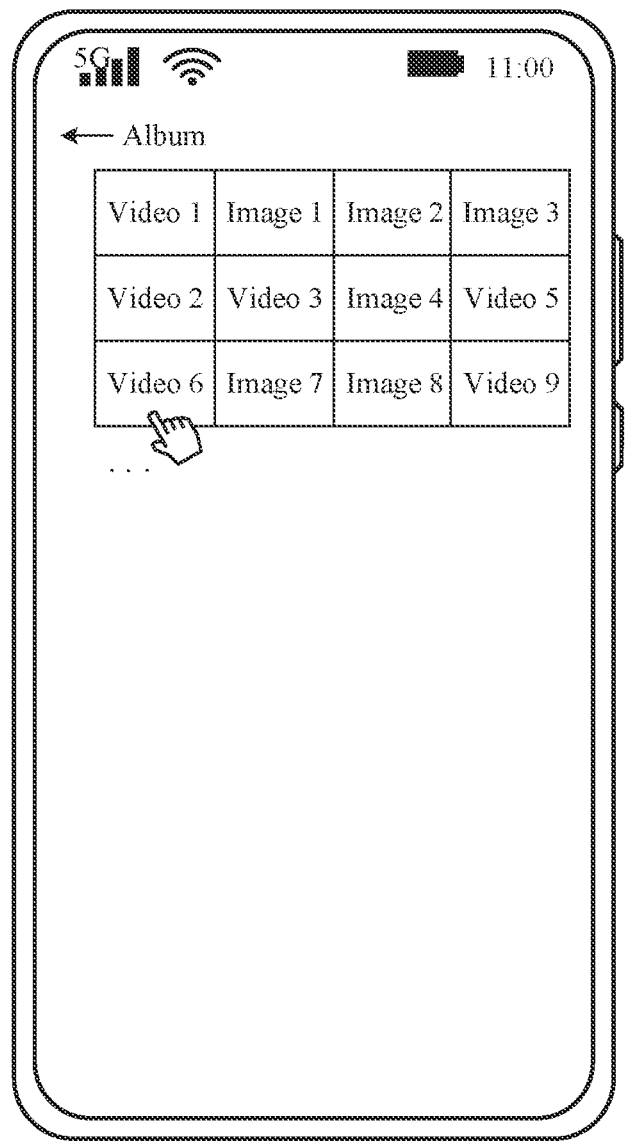
FIG. 17 is a schematic diagram of a display screen of a terminal device according to an embodiment of this application.
Figure 18:
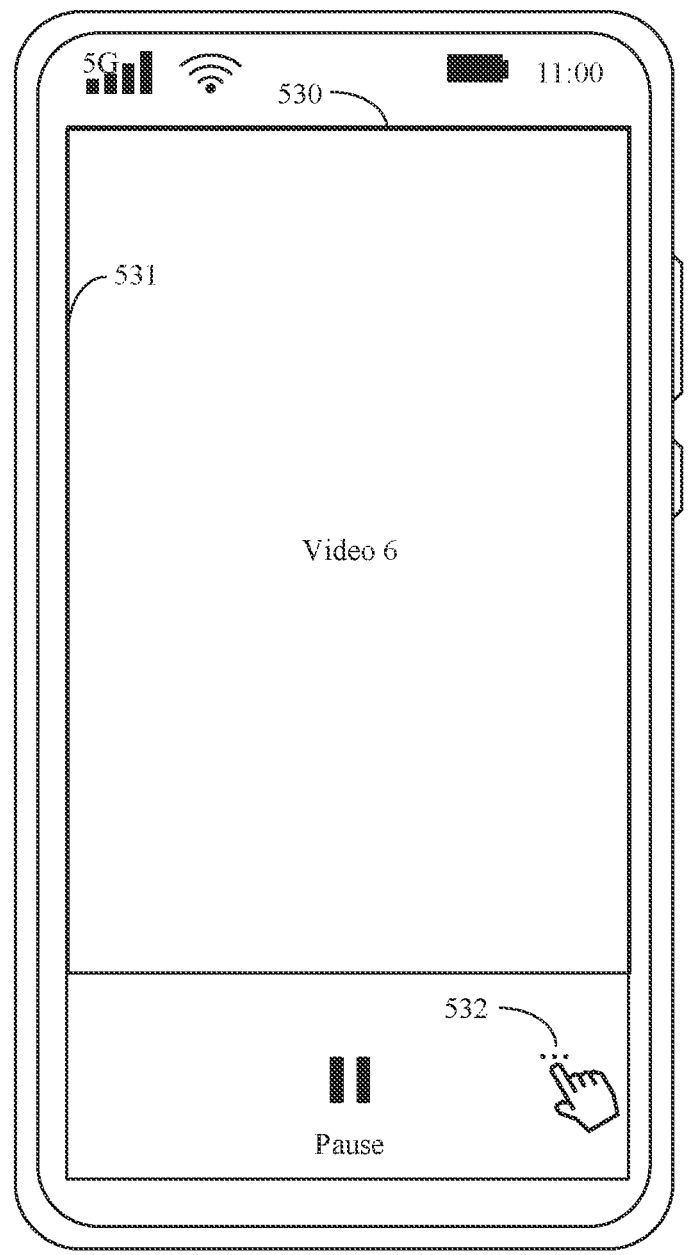
FIG. 18 is a schematic diagram of a display screen of a terminal device according to an embodiment of this application.
Figure 19:
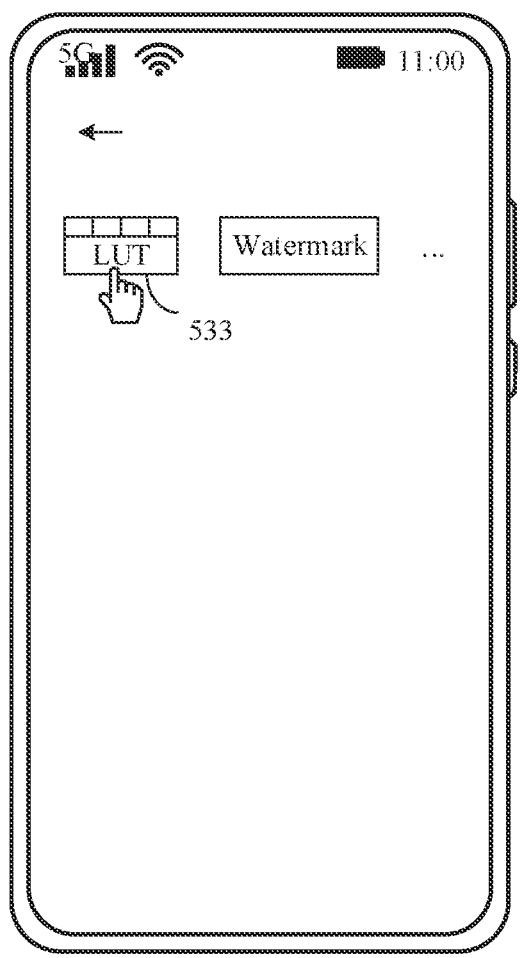
FIG. 19 is a schematic diagram of a display screen of a terminal device according to an embodiment of this application.
Figure 20:
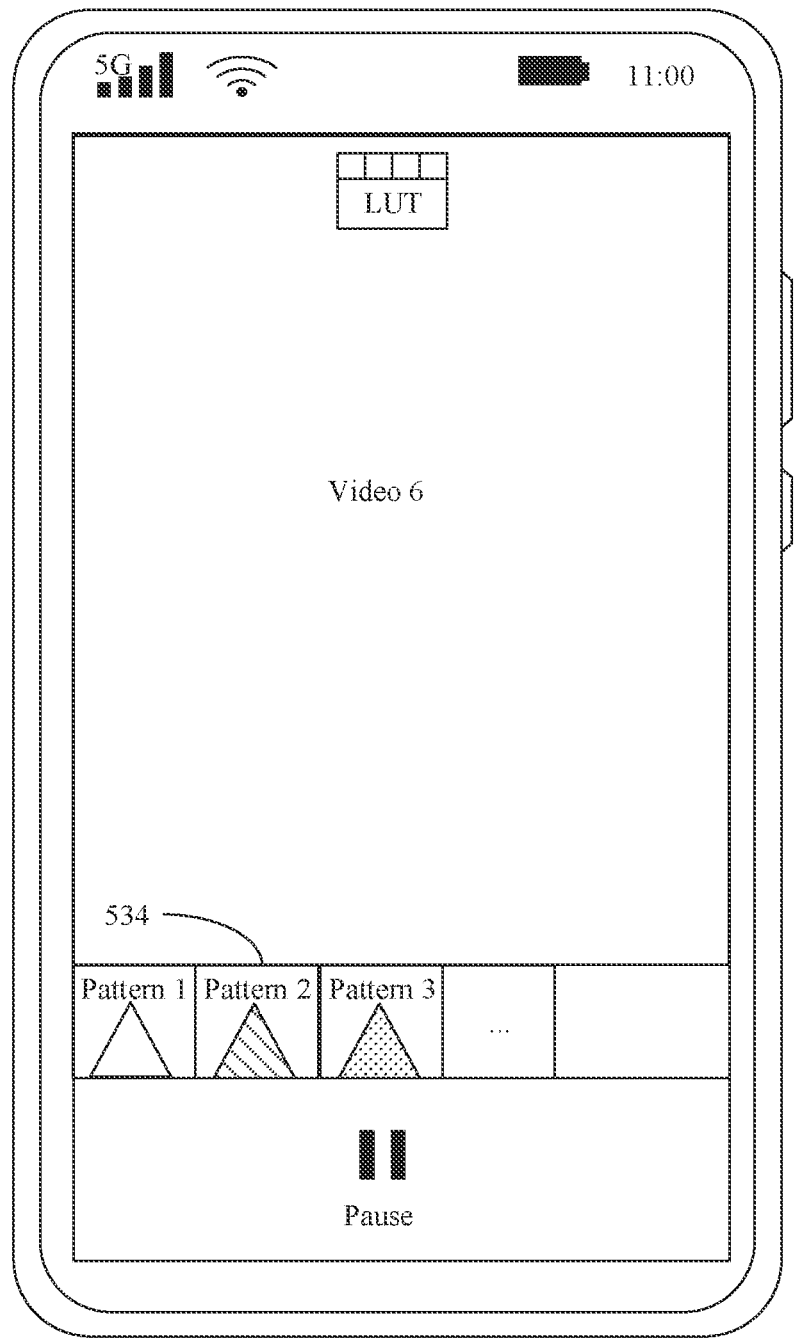
FIG. 20 is a schematic diagram of a display screen of a terminal device according to an embodiment of this application.

For example, FIG. 16 is a schematic diagram of a display home screen 510 of a terminal device. After detecting an operation of taping an icon 520 of a gallery application on the home screen 510 by a user, the terminal device may enable the gallery application and display another GUI shown in FIG. 17. FIG. 17 shows an album of the terminal device. The album includes videos and images. The terminal device detects an operation of taping a video 6 in the album by the user, and displays the video 6 on a display screen of the terminal device in response to the user's operation, as shown in FIG. 18. The display screen 530 shown in FIG. 18 includes a viewfinder frame 531, and content of the video 6 is displayed in the viewfinder frame 531. The shooting screen 530 further includes more options 532. When detecting an operation of taping the more options 532 by the user, the terminal device displays a setting screen of the more options in response to the user's operation, as shown in FIG. 19. The setting screen of the more options includes an LUT option 533, a watermark option, and other options. After detecting an operation of taping the LUT option by the user, the terminal device displays a screen shown in FIG. 20. A preview box 534 including a plurality of different image patterns is displayed on the shooting screen 530, and the preview box 534 may include a pattern 1, a pattern 2, a pattern 3, and the like as well as slow motion. The image patterns may include but are not limited to image patterns such as Hollywood Classics, Superheroes, Happy City, 1990s, Cherry Blossoms of Early Spring, Mysterious Realm, Black and White Phantom, and Warm Light. It should be understood that, the names of the foregoing image patterns are used as examples for description. This is not limited in this application.

Figure 21:
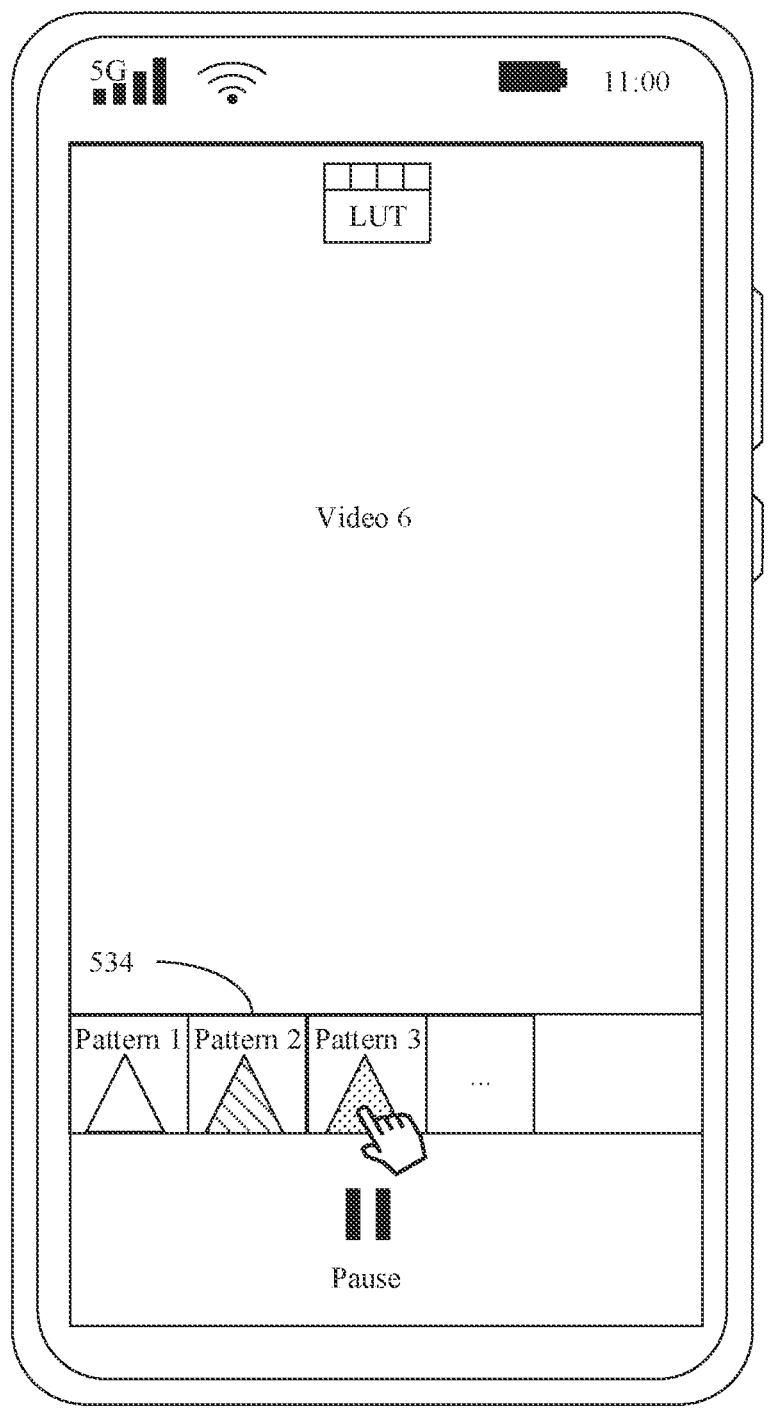
FIG. 21 is a schematic diagram of a display screen of a terminal device according to an embodiment of this application.

In an example, as shown in FIG. 21, if the terminal device detects an operation of taping the pattern 3 in the preview box 534 by the user, the terminal device performs image processing on the video 6 according to the pattern 3. For specific processes, refer to the flowcharts shown in FIG. 14 and FIG. 15. Details are not described herein again.

It should be understood that, a difference between the implementation 2 and the implementation 1 lies in that: In the implementation 2, an image processing instruction is triggered by using the gallery application, the three-dimensional lookup table algorithm in the camera algorithm library is invoked by using the image processing instruction, and the camera algorithm library sends the video and the target three-dimensional lookup table to the GPU or the DSP for processing to obtain the target video. In addition, because the obtained video is a shot video, the shot video can be directly invoked from the gallery with no need to obtain an image frame by using an image signal processor.

The image processing method provided in this embodiment of this application is described in detail above with reference to FIG. 1 to FIG. 21. Apparatus embodiments of this application are described in detail below with reference to FIG. 22 and FIG. 23. It should be understood that, the apparatus in the embodiments of this application may perform various methods in the foregoing embodiments of this application. In other words, for specific working processes of the following products, refer to corresponding processes in the foregoing method embodiments.

Figure 22:
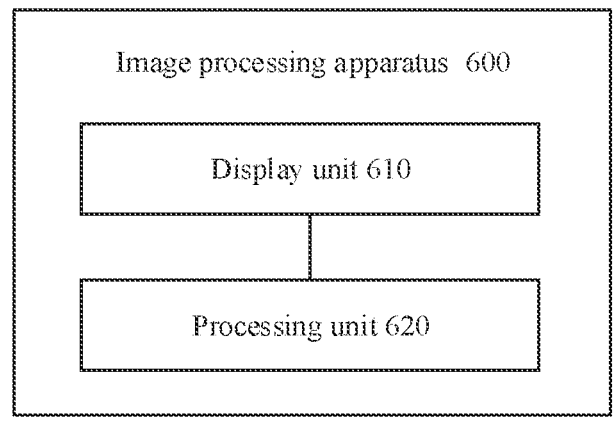
FIG. 22 is a schematic diagram of an image processing apparatus according to an embodiment of this application.

FIG. 22 is a schematic structural diagram of an image processing apparatus according to an embodiment of this application. The image processing apparatus 600 includes a display unit 610 and a processing unit 620.

The display unit 610 is configured to display a first screen, where the first screen includes a first control. The processing unit 620 is configured to: detect a first operation on the first control; determine a first mapping in a three-dimensional lookup table in response to the first operation, where the first mapping is corresponding to the first control; convert a to-be-processed image in a first color space into a first image in a second color space, where the to-be-processed image is an image obtained in the first color space; process the first image according to the first mapping to obtain a second image; and convert the second image in the second color space into a third image in the first color space.

Optionally, in an embodiment, the image processing apparatus includes the pre-stored three-dimensional lookup table, and the processing unit 620 is specifically configured to:
  determine, according to an identifier of the first mapping, the first mapping from the pre-stored three-dimensional lookup table.

Optionally, in an embodiment, the processing unit 620 is specifically configured to:
  perform first processing on the to-be-processed image to obtain a first-processed image, where the first processing is adjusting an image width of the to-be-processed image; and
  convert the first-processed image into the first image in the second color space.

Optionally, in an embodiment, the processing unit 620 is specifically configured to:
  process the first image according to the first mapping and a tetrahedron interpolation algorithm to obtain the second image.

Optionally, in an embodiment, the processing unit 620 is specifically configured to:
  map each pixel in the first image according to the first mapping and the tetrahedron interpolation algorithm to obtain a target pixel; and
  obtain the second image based on the target pixels.

Optionally, in an embodiment, the processing unit 620 is further configured to:
perform second processing on the third image, where the second processing is adjusting an image width of the third image to be the same as the image width of the to-be-processed image.

Optionally, in an embodiment, the first control is a control that is used to indicate the first mapping in the three-dimensional lookup table.

Optionally, in an embodiment, the first control is a control that is used to indicate automatic identification of the first mapping in the three-dimensional lookup table.

Optionally, in an embodiment, the image processing apparatus includes a first processor and a second processor. The first processor is configured to obtain the to-be-processed image; and the second processor is configured to: convert the to-be-processed image in the first color space into the first image in the second color space, process the first image according to the first mapping to obtain the second image, and convert the second image in the second color space into the third image in the first color space.

Optionally, in an embodiment, the first processor is an image signal processor, and the second processor is a digital signal processor or a graphics processing unit.

It should be noted that the processing apparatus 600 is embodied in a form of a functional unit. The term "unit" herein may be implemented by software and/or hardware. This is not specifically limited herein.

For example, the "unit" may be implemented by a software program, a hardware circuit, or a combination thereof that can implement the foregoing function. The hardware circuit may include an application-specific integrated circuit (application-specific integrated circuit, ASIC), an electronic circuit, a processor for executing one or more software or firmware programs (for example, a shared processor, a dedicated processor, or a group processor) and a memory, a combined logic circuit, and/or another suitable component that supports the described function.

Therefore, units in various examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 23:
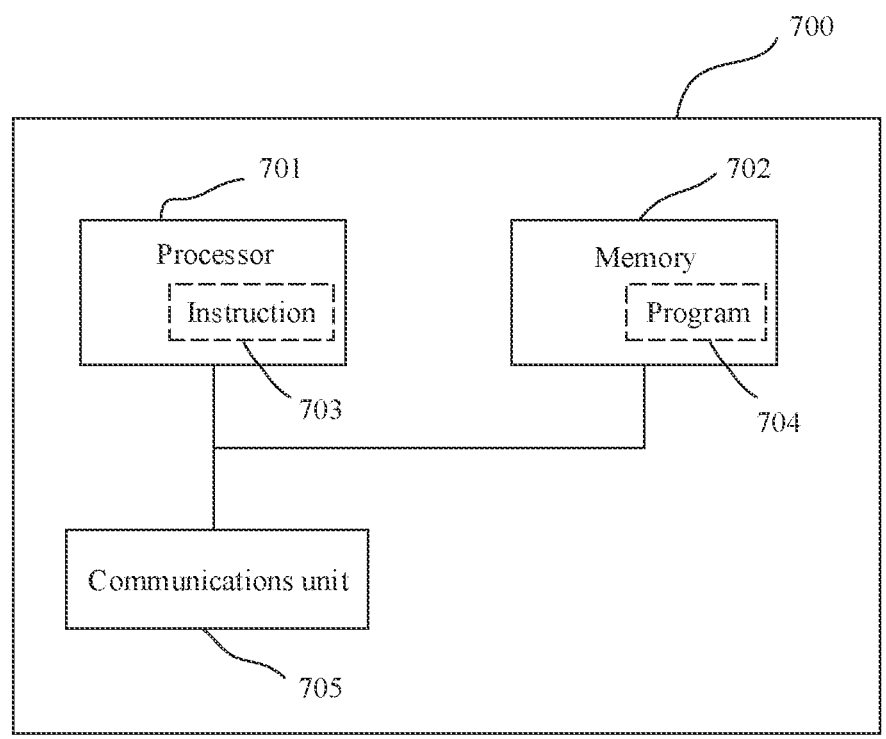
FIG. 23 is a schematic diagram of an electronic device for image processing according to an embodiment of this application.

FIG. 23 is a schematic structural diagram of an electronic device according to this application. A dashed line in FIG. 23 indicates that a unit or a module is optional. The electronic device 700 may be configured to implement the image processing method described in the foregoing method embodiment.

The electronic device 700 includes one or more processors 701, and the one or more processors 701 can support the electronic device 700 in implementing the method in the method embodiment. The processor 701 may be a general-purpose processor or a dedicated processor. For example, the processor 701 may be a central processing unit (central processing unit, CPU), a digital signal processor (digital signal processor, DSP), an application-specific integrated circuit (application-specific integrated circuit, ASIC), a field programmable gate array (field programmable gate array, FPGA), or another programmable logic device, for example, a discrete gate, a transistor logic device, or a discrete hardware component.

The processor 701 may be configured to control the electronic device 700 to execute a software program and process data of the software program. The electronic device 700 may further include a communications unit 705, configured to input (receive) and output (send) signals.

For example, the electronic device 700 may be a chip, and the communications unit 705 may be an input and/or output circuit of the chip. Alternatively, the communications unit 705 may be a communications interface of the chip, and the chip may be used as a constituent part of the terminal device or another electronic device.

For another example, the electronic device 700 may be a terminal device. The communications unit 705 may be a transceiver of the terminal device, or the communications unit 705 may be a transceiver circuit of the terminal device.

The electronic device 700 may include one or more memories 702, and the memory 702 stores a program 704. The program 704 may be run by the processor 701 to generate an instruction 703, so that the processor 701 performs the image processing method described in the foregoing method embodiment according to the instruction 703.

Optionally, the memory 702 may further store data. Optionally, the processor 701 may further read the data stored in the memory 702. The data may be stored at a same storage address as the program 704, or the data may be stored at a storage address different from that of the program 704.

The processor 701 and the memory 702 may be provided separately or integrated together, for example, integrated on a system on chip (system on chip, SOC) of the terminal device.

For example, the memory 702 may be configured to store the related program 704 in the image processing method provided in the embodiments of this application. The processor 701 may be configured to: during image processing, invoke the related program 704 in the image processing method stored in the memory 702, to perform the image processing method in the embodiments of this application. For example, the method includes: displaying a first screen, where the first screen includes a first control; detecting a first operation on the first control; determining a first mapping in a three-dimensional lookup table in response to the first operation, where the first mapping is corresponding to the first control; converting a to-be-processed image in a first color space into a first image in a second color space, where the to-be-processed image is an image obtained in the first color space; processing the first image according to the first mapping to obtain a second image; and converting the second image in the second color space into a third image in the first color space.

This application further provides a computer program product. When the computer program product is executed by a processor 701, the image processing method in any method embodiment of this application is implemented.

The computer program product may be stored in a memory 702. For example, the computer program product is a program 704. After having undergone processing processes such as pre-processing, compilation, assembly, and linking, the program 704 is finally converted into an executable object file that can be executed by the processor 701.

This application further provides a computer-readable storage medium. The computer-readable storage medium stores a computer program. When the computer program is executed by a computer, the image processing method in any method embodiment of this application is implemented. The computer program may be a high-level language program or may be an executable object program.

Optionally, the computer-readable storage medium is, for example, a memory 702. The memory 702 may be a volatile memory or a non-volatile memory, or the memory 702 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not restrictive description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person skilled in the art may clearly understand that, for ease and brevity of description, for specific working processes of the apparatus and the device described above and the achieved technical effects, refer to the corresponding processes and the technical effects in the foregoing method embodiments. Details are not described herein again.

In the several embodiments provided in this application, the disclosed system, apparatus, and method may be implemented in other manners. For example, some features of the method embodiments described above may be ignored or may not be implemented. The apparatus embodiment described above is merely an example. The unit division is merely logical function division, and there may be another division manner in actual implementation. A plurality of units or components may be combined or may be integrated into another system. In addition, the coupling between units or between components may be direct coupling or indirect coupling, and the above-mentioned coupling includes electrical, mechanical or other forms of connection.

It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: only A, both A and B, and only B. In addition, the character "/" in this specification generally represents an "or" relationship between the associated objects.

To sum up, the foregoing descriptions are merely preferred embodiments of the technical solutions of this application, but are not intended to limit the protection scope of this application. Any modification, equivalent replacement, or improvement made without departing from the principle of this application shall fall within the protection scope of this application.

What is claimed is:

1. An image processing method, applied to an electronic device, wherein the image processing method comprises:
    displaying a first screen, wherein the first screen comprises a first control; when the first screen is a shooting screen, and a preview box including different image patterns displayed on the shooting screen, the first control is a control for indicating an image pattern in the preview box, wherein when the first screen is a setting screen, the first control is an AI movie color grading control;
    detecting a first operation on the first control;
    determining a first mapping in a three-dimensional lookup table in response to the first operation, wherein the first mapping is corresponding to the first control;
    converting a to-be-processed image in a first color space into a first image in a second color space, wherein the to-be-processed image is an image obtained in the first color space, the first color space is a YUV color space, and a second color space is an RGB color space;
    processing the first image in aspect of hue, saturation, and brightness according to the first mapping to obtain a second image; and
    converting the second image in the second color space into a third image in the first color space.

2. The image processing method according to claim 1, wherein the electronic device comprises a pre-stored three-dimensional lookup table, and the determining a first mapping in a three-dimensional lookup table comprises:
    determining, according to an identifier of the first mapping, the first mapping from the pre-stored three-dimensional lookup table.

3. The image processing method according to claim 1, wherein the converting a to-be-processed image in a first color space into a first image in a second color space comprises:
    performing first processing on the to-be-processed image to obtain a first-processed image, wherein the first processing is adjusting an image width of the to-be-processed image; and
    converting the first-processed image into the first image in the second color space.

4. The image processing method according to claim 1, wherein the processing the first image according to the first mapping to obtain a second image comprises:
    processing the first image according to the first mapping and a tetrahedron interpolation algorithm to obtain the second image.

5. The image processing method according to claim 4, wherein the processing the first image according to the first mapping and a tetrahedron interpolation algorithm to obtain the second image comprises:
    mapping each pixel in the first image according to the first mapping and the tetrahedron interpolation algorithm to obtain a target pixel; and
    obtaining the second image based on the target pixels.

6. The image processing method according to claim 1, further comprising:
    performing second processing on the third image, wherein the second processing is adjusting an image width of the third image to be the same as the image width of the to-be-processed image.

7. The image processing method according to claim 1, wherein the first control is a control that is used to indicate the first mapping in the three-dimensional lookup table.

8. The image processing method according to claim 1, wherein the first control is a control that is used to indicate automatic identification of the first mapping in the three-dimensional lookup table.

9. The image processing method according to claim 1, wherein the electronic device comprises a first processor and a second processor; wherein
the first processor is configured to obtain the to-be-processed image, and the second processor is configured to: convert the to-be-processed image in the first color space into the first image in the second color space, process the first image according to the first mapping to obtain the second image, and convert the second image in the second color space into the third image in the first color space.

10. The image processing method according to claim 9, wherein the first processor is an image signal processor, and the second processor is a digital signal processor or a graphics processing unit.

11. An electronic device, for image processing, comprising:
at least one processor; and
one or more memories coupled to the at least one processor and storing programming instructions for execution by the at least one processor to cause the electronic device to:
display a first screen, wherein the first screen comprises a first control; when the first screen is a shooting screen, a preview box including different image patterns displayed on the shooting screen, the first control is a control for indicating an image pattern in the preview box, wherein when the first screen is a setting screen, the first control is an AI movie color grading control;
detect a first operation on the first control;
determine a first mapping in a three-dimensional lookup table in response to the first operation, wherein the first mapping is corresponding to the first control;
convert a to-be-processed image in a first color space into a first image in a second color space, wherein the to-be-processed image is an image obtained in the first color space, the first color space is a YUV color space and a second color space is an RGB color space;
process the first image in aspect of hue, saturation, and brightness according to the first mapping to obtain a second image; and
convert the second image in the second color space into a third image in the first color space.

12. The electronic device according to claim 11, wherein the electronic device comprises a pre-stored three-dimensional lookup table, and the determine a first mapping in a three-dimensional lookup table comprises:
determine, according to an identifier of the first mapping, the first mapping from the pre-stored three-dimensional lookup table.

13. The electronic device according to claim 11, wherein the convert a to-be-processed image in a first color space into a first image in a second color space comprises:
perform first processing on the to-be-processed image to obtain a first-processed image, wherein the first processing is adjusting an image width of the to-be-processed image; and
convert the first-processed image into the first image in the second color space.

14. The electronic device according to claim 11, wherein the process the first image according to the first mapping to obtain a second image comprises:
process the first image according to the first mapping and a tetrahedron interpolation algorithm to obtain the second image.

15. The electronic device according to claim 14, wherein the process the first image according to the first mapping and a tetrahedron interpolation algorithm to obtain the second image comprises:
map each pixel in the first image according to the first mapping and the tetrahedron interpolation algorithm to obtain a target pixel; and
obtain the second image based on the target pixels.

16. The electronic device according to claim 11, wherein the programming instructions, when executed by the at least one processor, cause the electronic device to:
perform second processing on the third image, wherein the second processing is adjusting an image width of the third image to be the same as the image width of the to-be-processed image.

17. The electronic device according to claim 11, wherein the first control is a control that is used to indicate the first mapping in the three-dimensional lookup table.

18. The electronic device according to claim 11, wherein the first control is a control that is used to indicate automatic identification of the first mapping in the three-dimensional lookup table.

19. The electronic device according to claim 11, wherein the electronic device comprises a first processor and a second processor; and wherein the first processor is configured to obtain the to-be-processed image, and the second processor is configured to: convert the to-be-processed image in the first color space into the first image in the second color space, process the first image according to the first mapping to obtain the second image, and convert the second image in the second color space into the third image in the first color space.

20. A computer program product comprising computer-executable instructions for storage on a non-transitory computer-readable medium that, when executed by a processor, cause electronic device to:
display a first screen, wherein the first screen comprises a first control; when the first screen is a shooting screen, a preview box including different image patterns displayed on the shooting screen, the first control is a control for indicating an image pattern in the preview box, wherein when the first screen is a setting screen, the first control is an AI movie color grading control;
detect a first operation on the first control;
determine a first mapping in a three-dimensional lookup table in response to the first operation, wherein the first mapping is corresponding to the first control;
convert a to-be-processed image in a first color space into a first image in a second color space, wherein the to-be-processed image is an image obtained in the first color space, the first color space is a YUV color space, and a second color space is an RGB color space;
process the first image in aspect of hue, saturation, and brightness according to the first mapping to obtain a second image; and
convert the second image in the second color space into a third image in the first color space.

* * * * *